(12) United States Patent
Kuik et al.

(10) Patent No.: US 7,281,062 B1
(45) Date of Patent: *Oct. 9, 2007

(54) VIRTUAL SCSI BUS FOR SCSI-BASED STORAGE AREA NETWORK

(75) Inventors: Timothy J. Kuik, Lino Lakes, MN (US); David Patrick Thompson, Rogers, MN (US); Mark A. Bakke, Maple Grove, MN (US); Clayton Stuart Haapala, Minnetonka, MN (US); Stephen P. De Groote, Maple Grove, MN (US); Craig A. Johnson, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 455 days.

This patent is subject to a terminal disclaimer.

(21) Appl. No.: 10/131,793

(22) Filed: Apr. 22, 2002

(51) Int. Cl.
*G06F 15/16* (2006.01)
(52) U.S. Cl. ............... 709/249; 709/203; 709/230; 370/395.52; 370/463; 370/466; 710/305
(58) Field of Classification Search ............... 709/249, 709/211, 217, 220, 230; 370/401, 466; 711/114, 711/118, 209; 718/104; 719/319
See application file for complete search history.

(56) References Cited

U.S. PATENT DOCUMENTS

| | | | |
|---|---|---|---|
| 5,996,024 A | 11/1999 | Blumenau | 709/301 |
| 6,041,381 A | 3/2000 | Hoese | |
| 6,131,119 A | 10/2000 | Fukui | |
| 6,209,023 B1* | 3/2001 | Dimitroff et al. | 709/211 |
| 6,400,730 B1* | 6/2002 | Latif et al. | 370/466 |
| 6,470,382 B1* | 10/2002 | Wang et al. | 709/220 |
| 6,480,901 B1 | 11/2002 | Weber et al. | |
| 6,484,245 B1 | 11/2002 | Sanada et al. | |
| 6,640,278 B1 | 10/2003 | Nolan et al. | |
| 6,654,830 B1 | 11/2003 | Taylor et al. | |
| 6,658,459 B1 | 12/2003 | Kwan et al. | |

(Continued)

OTHER PUBLICATIONS

Satran, J., et al., "iSCSI", IPS Internet Draft, draft—ietf—ips—iSCSI—12.txt, Category: standards—track, (2002), pp. 1-260.

(Continued)

*Primary Examiner*—Yves Dalencourt
(74) *Attorney, Agent, or Firm*—Schwegman, Lundberg & Woessner P.A.

(57) ABSTRACT

A storage router having an internet protocol (IP) port for coupling to a network supporting IP packets, a fibre channel port for coupling to a fibre channel network to a plurality of storage devices, and a SCSI router having an iSCSI interface that extracts SCSI command and data information from packets received through the IP port, wherein the SCSI router passes the extracted SCSI command and data information to the fiber channel port. Some embodiments further include a session to an information-handling system. The session supports a target-only mapping (wherein a source-specified target value is replaced by a mapped target value that is then passed by the SCSI router toward a first storage device and its LUNs), or target-and-LUN mapping (wherein source-specified target and LUN information is replaced by mapped target-and LUN information such as a loop-ID and LUN combination, a WWPN and LUN combination, or a WWNN).

29 Claims, 13 Drawing Sheets

U.S. PATENT DOCUMENTS

| | | |
|---|---|---|
| 6,683,883 B1 * | 1/2004 | Czeiger et al. ............. 370/401 |
| 6,757,291 B1 | 6/2004 | Hu |
| 6,763,419 B2 | 7/2004 | Hoese et al. |
| 6,845,403 B2 * | 1/2005 | Chadalapaka ................. 710/5 |
| 6,895,461 B1 | 5/2005 | Thompson |
| 2002/0103943 A1 | 8/2002 | Lo et al. |
| 2002/0116460 A1 | 8/2002 | Treister et al. |
| 2003/0018927 A1 | 1/2003 | Gadir et al. |
| 2003/0182455 A1 | 9/2003 | Hetzler et al. |
| 2003/0210686 A1 | 11/2003 | Terrell et al. |
| 2004/0233910 A1 | 11/2004 | Chen et al. |

OTHER PUBLICATIONS

Meth, K. Z., et al., "Design of the iSCSI protocol", *Proceedings of the 20th IEEE Conference on Mass Storage Systems and Technologies*, (Apr. 7-10, 2003), 116-122.

Simitci, H., et al., "Evaluation of SCSP over TCP/IP and SCSI over fibre channel connections", *Hot Interconnects, 9, IEEE 2001*, (Aug. 2001),87-91.

\* cited by examiner

VIRTUAL SCSI BUS FOR SCSI-BASED STORAGE AREA NETWORK

RELATED APPLICATIONS

This invention is related to application Ser. No. 10/122,401, filed Apr. 11, 2002, which in now pending entitled "METHOD AND APPARATUS FOR SUPPORTING COMMUNICATIONS BETWEEN NODES OPERATING IN A MASTER-SLAVE CONFIGURATION", which is a continuation of application Ser. No. 09/949,182, filed Sep. 7, 2001, which is now abandoned entitled "METHOD AND APPARATUS FOR SUPPORTING COMMUNICATIONS BETWEEN NODES OPERATING IN A MASTER-SLAVE CONFIGURATION"; application Ser. No. 10/094,552, filed Mar. 7, 2002, which is now pending entitled "METHOD AND APPARATUS FOR EXCHANGING HEARTBEAT MESSAGES AND CONFIGURATION INFORMATION BETWEEN NODES OPERATING IN A MASTER-SLAVE CONFIGURATION"; application Ser. No. 10/131,275, filed even date herewith, which is now pending entitled "METHOD AND APPARATUS FOR CONFIGURING NODES AS MASTERS OR SLAVES"; application Ser. No. 10/131,274, filed even date herewith, entitled "METHOD AND APPARATUS FOR TERMINATING APPLICATIONS IN A HIGH-AVAILABILITY NETWORK"; Ser. No. 10/131,793, filed even date herewith, which is now pending entitled "SCSI-BASED STORAGE AREA NETWORK"; Ser. No. 10/131,782, filed even date herewith, which is now pending entitled "VIRTUAL MAC ADDRESS SYSTEM AND METHOD"; Ser. No. 10/128,655, filed even date herewith, which is now U.S. Pat. No. 7,200,610 entitled, "SYSTEM AND METHOD FOR CONFIGURING FIBRE-CHANNEL DEVICES"; application Ser. No. 10/131,789, filed even date herewith, which in now U.S. Pat. No. 6,895,461 entitled "METHOD AND APPARATUS FOR ASSOCIATING AN IP ADDRESS AND INTERFACE TO A SCSI ROUTING INSTANCE"; application Ser. No. 10/128,657, filed even date herewith, which is now pending entitled "METHOD AND APPARATUS FOR EXCHANGING CONFIGURATION INFORMATION BETWEEN NODES OPERATING IN A MASTER-SLAVE CONFIGURATION"; and application Ser. No. 10/128,993, filed even date herewith, which now U.S. Pat. No. 7,188,194 entitled "SESSION-BASED TARGET/LUN MAPPING FOR A STORAGE AREA NETWORK AND ASSOCIATED METHOD", filed even date herewith, all of the above of which are hereby incorporated by reference.

FIELD OF THE INVENTION

This invention relates to the field of networks and storage, and more specifically to a method and apparatus for providing a virtual SCSI bus for an iSCSI-based storage area network in order to access remote storage using iSCSI and an IP network.

BACKGROUND OF THE INVENTION

Interest in the use of network-based storage systems has increased considerably recently. Storage servers connected to a network provide commonly available mass storage that can be shared or allocated exclusively to each of a plurality of computers or other information-handling systems connected to a common network.

The small computer system interface (SCSI) is a widely used standard for accessing various storage devices such as hard discs, CDROMs, DVDs, ZIP discs, tape, Superdisks, etc. Newer versions and interface definitions have been developed, including wide, fast, wide and fast, 40 MB/s, 80 MB/s, 160 MB/s and fiber channel (both copper-wire and optical versions), etc., however these interfaces are all storage-based architectures.

The internet and many other communications networks use TCP/IP (including the software interface layers for telecommunications protocol and internet protocol) to pass data. It generally takes a dedicated computer interface to receive and decode (or code and transmit) TCP/IP packets, and to pass data carried by such packets to applications residing at higher layers Gigabit-per-second ethernet (often abbreviated GbE and pronounced gig-E) systems exist that quickly transfer data between systems. Many such GbE network systems use TCP/IP on top of the GbE protocol used immediately on the "metal" or the hardware network itself. Placing storage servers on the network has been done, however there is an overhead in expense, speed and cost involved in maintaining such servers. Further, remote computers in such systems do not have direct access to their data, wherein they keep track of their own SCSI-based targets and LUNs (logical unit numbers), and directly access their own data using the target-LUN information they maintain.

There is a need in the art for an improved storage-area network apparatus and method.

SUMMARY OF THE INVENTION

The present invention provides a storage having an internet protocol (IP) port for coupling to a network supporting IP packets, a fibre channel port for coupling to a fibre channel network to a plurality of storage devices, and a SCSI router having an iSCSI interface that extracts SCSI command and data information from packets received through the IP port, wherein the SCSI router passes the extracted SCSI command and data information to the fiber channel port. Some embodiments further include one or more IP communications sessions established to each of one or more information-handling systems. Each session supports a target-only mapping (wherein a source-specified target value is replaced by a mapped target value (either a loopID for fibre channel (FC) loop networks, or a WWPN for a fibre-channel fabric network) that is then passed by the SCSI router toward a first storage device and its LUNs), or target-and-LUN mapping (wherein source-specified target and LUN information is replaced by mapped target-and LUN information such as a loop-ID and LUN combination (for devices on an FC loop), a WWPN and LUN combination (for devices on an FC fabric), or a WWNN).

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Storage Router Overview

Figure 1:
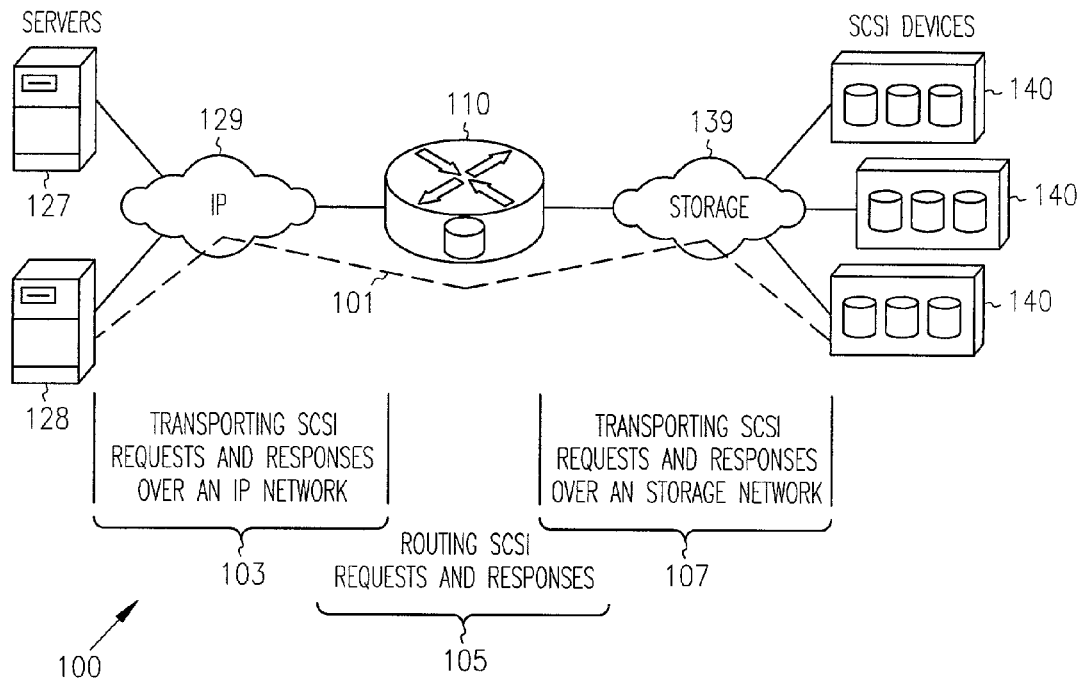
FIG. 1 is a function block diagram of an exemplary system 100 having storage router 110.

FIG. 1 is a block diagram of an exemplary system 100 having storage router 110. Storage router 110 provides one or more servers 127-128 (devices 127 through 128 can be any type of information-handling systems, such as servers or other types of computers) or other with internet-protocol (IP)-based access to storage 140 through SCSI routing using the iSCSI protocol. The iSCSI protocol is a protocol for encapsulating SCSI requests and responses over IP. For example, with SCSI routing, a server 128 uses an IP network 129 to access storage 140 on storage network 139 as if the servers 127 were directly attached to the storage devices 140. This access is shown as dotted-line path 101. SCSI requests and responses are passed between servers 127-128 and storage 140 along path 101, wherein the computers on the left see an iSCSI interface, numbering the iSCSI targets and LUNs as it wants to see them, and the storage devices on the right are accessed using their target and LUN conventions, and storage router 110 in the middle maps between one and the other scheme. Path 101 may be implemented as portion 103, portion 105 and portion 107. Portion 103 transports SCSI requests and responses over IP network 129. Portion 105 routes SCSI requests and responses, allowing each of the programs running in servers 127-128 to have a virtual view of their own portions of the storage that is independent of and mapped to the physical layout of the storage 140. Portion 107 transports SCSI requests and responses over storage network 139.

Note: The iSCSI protocol is an IETF-defined protocol for IP storage (IPS). The Internet Engineering Task Force (IETF) is a large open international community of network designers, operators, vendors, and researchers concerned with the evolution of the Internet architecture and the smooth operation of the Internet. It is open to any interested individual. For more information about the iSCSI protocol, refer to the IETF standards for IP storage at.

Figure 2:
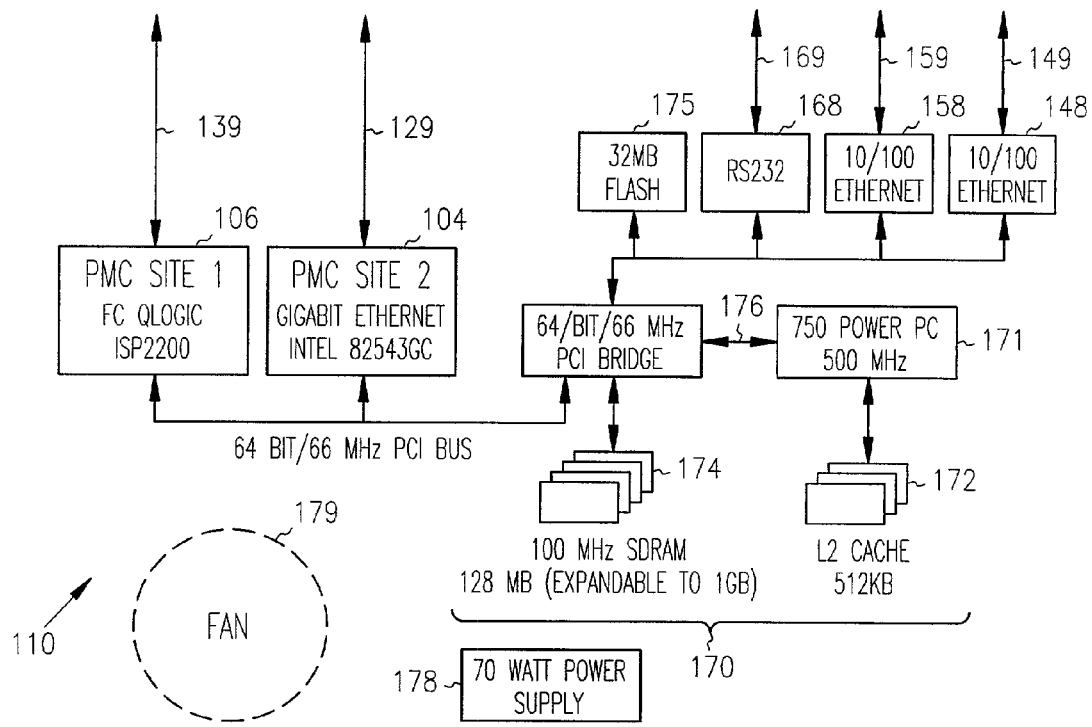
FIG. 2 shows a hardware block diagram of one embodiment of storage router 110.

FIG. 2 shows a hardware block diagram of one embodiment of storage router 110. In some embodiments, storage router 110 is implemented in a 1U rack-mountable chassis that includes the following main hardware components:

Processor 170, which runs the storage router 110 software;

Gigabit Ethernet interface 106, which provides connection to an IP network for access by servers;

Fibre Channel interface 104, which provides connection to a storage network for access to storage devices.

HA interface 148, which provides a physical connection for high availability communication with another storage router 110. The HA interface includes of a 10/100 Ethernet interface.

Management interfaces 158 and 168, which provide connections for managing the storage router 110. The Management interfaces include RS-232 interface 168 for local console connection and a 10/100 Ethernet interface 158 for local or network connection.

In some embodiments, processor 170 is implemented as a 750PowerPC microprocessor 171 running at 400 MHz and having 512 KB of local L2 cache 172. Microprocessor 171 connects to a 64-bit, 66-MHz PCI bridge 173 that controls 128 MB to 1 GB of SDRAM 174. The chassis is powered by a 70 watt power supply 178 and cooled by fan 179. In some embodiments, the GbE interface 104 is implemented using Intel 82543GC-type hardware at a first PCI interface site, and the storage interface is implemented at a second PCI interface site using either Qlogic ISP2200-type hardware to provide a fibre-channel interface, or by a Qlogic 1100-type hardware to provide a parallel SCSI interface. In some embodiments, a 32 MB FLASH-type non-volatile storage 175 is provided to store the software that is loaded into processor 170.

The storage router 110 software provides SCSI routing between servers and the storage devices. The software includes a command line interface (CLI) and web-based graphical user interface (GUI) for operation, configuration and administration, maintenance, and support tasks of storage router 110 from a terminal connected to one or both of the management ports 158 and/or 168.

In some embodiments, each server 127-128 that requires IP access to storage 140 via the storage router 110 needs to have an iSCSI driver, such as the Cisco Storage Networking iSCSI driver, installed. Using the iSCSI protocol, the iSCSI driver allows a server 128 to generate SCSI requests and responses and transport them over an IP network 129. From the perspective of a server's operating system, the iSCSI driver appears to be a SCSI or Fibre Channel driver for a peripheral channel in the server 128.

Figure 3:
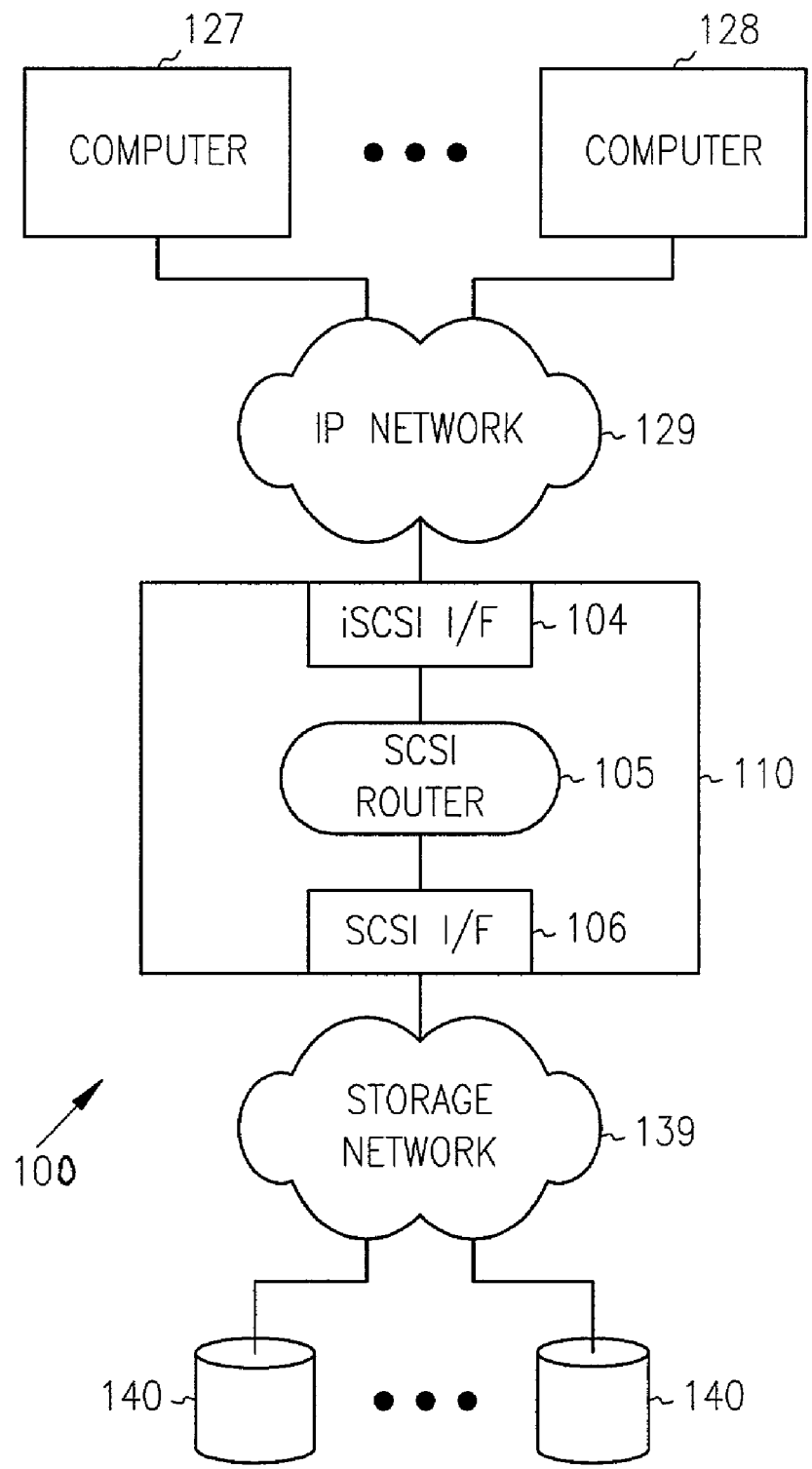
FIG. 3 is a function block diagram of an exemplary system 100 having storage router 110.

FIG. 3 is a function block diagram of an exemplary system 100 having storage router 110. A plurality of computers 127-128 formulate storage commands as if to their own iSCSI devices (with target and LUN addresses (or names)). These get placed in IP packets that are passed over IP network 129 (for example, a GbE network) and are received by iSCSI interface 104 which strips off TCP/IP headers. SCSI router 105 then maps the logical iSCSI targets or target/LUN combinations to SCSI addresses used on storage network 139. Interface 106, which in some embodiments is a Fiber Channel interface, and in other embodiments is a parallel SCSI interface, then packages the commands and/or data (for example, adding FCP headers and FC headers for information going to an FC network 139) and sends it to one of the storage devices 140.

Figure 4:
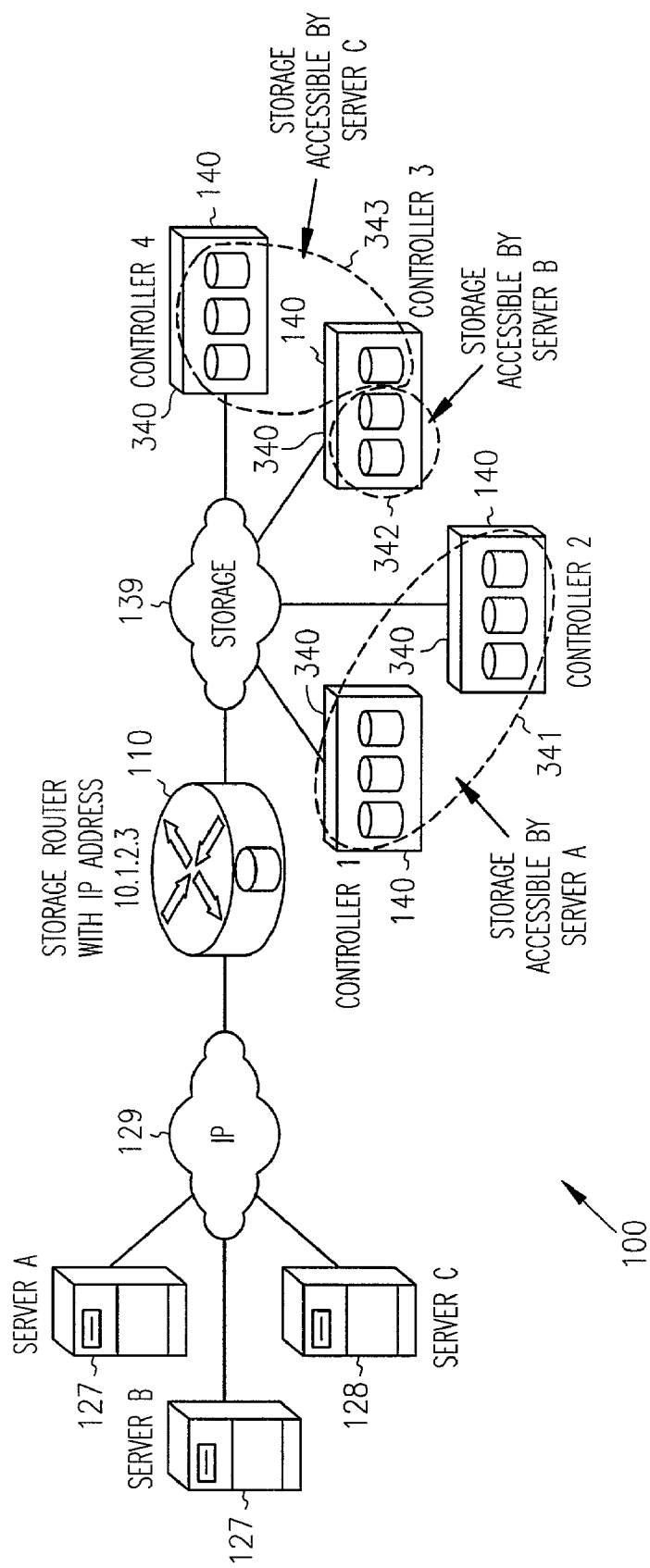
FIG. 4 is a block diagram representing the concept of storage mapping and access control.

FIG. 4 shows the concepts of storage mapping and access control. Three servers 127-128 (labeled Server A 127, Server B 127, and Server C 128) package storage command into IP packets addressed to storage router 110 having IP address 10.1.2.3, which extracts the iSCSI commands from the IP, maps the storage addresses from those provided by the servers to those used by the four disk controllers 340. The driver in each server 127-128 is configured to access the storage router IP address "10.1.2.3". An access list 322 (see FIG. 5) in the storage router 110 specifies that servers A, B, and C are allowed to access the mapped storage devices. From the perspective of a server, each disk drive mapped to it appears as a locally attached disk drive. FIG. 4 is discussed in more detail below.

Figure 5:
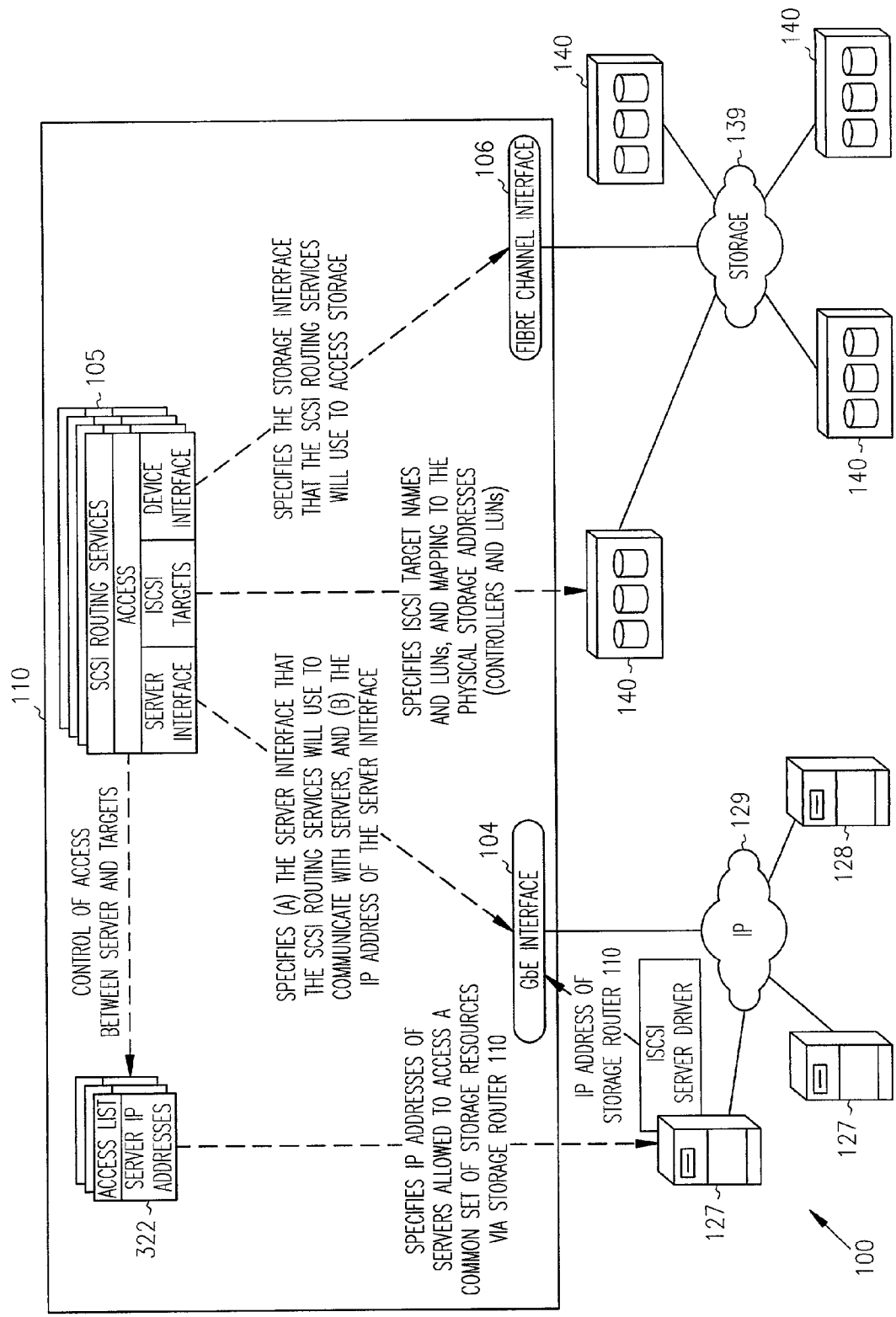
FIG. 5 is a block diagram of internal functions of storage router 110.

FIG. 5 is a block diagram of internal functions of storage router 110. In each computer 127-128, an iSCSI server driver is set up with the IP address of storage router 110 (i.e., the address of GbE interface 104). Each SCSI router session or instance 105 has an access list 322, which checks the requests received against those that are allowed, i.e., the access list specified IP addresses of those servers that are allowed access to a common set of storage resources 140. Each SCSI router session specifies (a) the server interface, i.e., the server interface that the SCSI router session will use to communicate with the servers, and (b) the IP address of the server interface; the iSCSI targets, i.e., it specifies iSCSI target names and LUNs, and the mapping to the physical storage addresses (i.e., the controllers and/or LUNs), and the device interface, i.e., it specifies the storage interface that the SCSI routing services will use to access storage 140.

SCSI Routing Overview

SCSI routing is the routing of SCSI requests and responses between servers in an IP network and storage devices in a storage network. Refer again to FIG. 1, which shows a SCSI routing overview.

SCSI routing includes three main actions (FIG. 3):
transporting 104 SCSI requests and responses over an IP network between the servers and the storage router 110;
routing 105 SCSI requests and responses between servers on an IP network and storage devices on a storage network; and
transporting 106 SCSI requests and responses over a storage network between the storage router 110 and physical storage devices.

Figure 6:
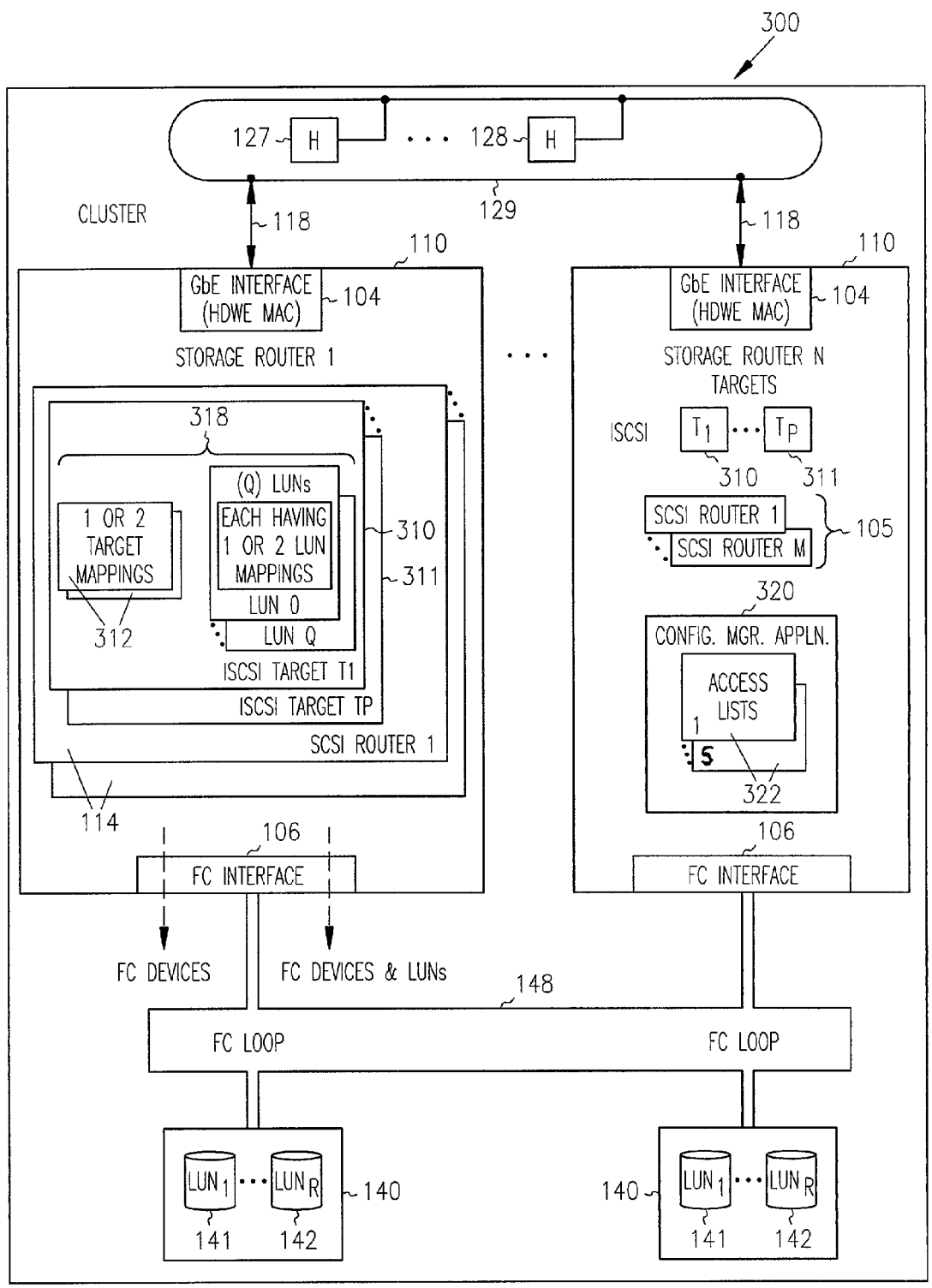
FIG. 6 shows an exemplary storage-router cluster 300 showing SCSI routing.

FIG. 6 shows an exemplary storage-router cluster 300 showing SCSI routing. Cluster 300 includes a plurality of computers or hosts 127-128 connected on network 129 to a plurality of storage routers 110 using GbE connections 118 to GbE interfaces 104. In some embodiments, each GbE interface 104 has a hardware MAC address used to identify IP packets destined for that particular GbE interface 104. In some embodiments, this hardware MAC address is replaced by a MAC address that includes at least a portion of an IP address used to route packets. Respective sessions are created between a respective host (from among hosts 127 through 128) and a particular iSCSI target (from among targets 310 through 311). SCSI routing occurs in the storage router 110 through the mapping between physical storage devices (or LUNs located on physical devices) and iSCSI targets (310-311). An iSCSI target (e.g., 310, also called logical target 310) is an arbitrary name or value for a group of one or more physical storage devices. One can map a single iSCSI target to multiple physical devices. An iSCSI target always includes or contains at least one Logical Unit Number (LUN). Each LUN on an iSCSI target is mapped to a single LUN on a physical storage target.

SCSI router 105 includes one or more instances 114, one for each iSCSI target 310-311. Each instance 114 uses the respective mapping 318 to convert the iSCSI address to the physical address used to access a particular LUN 141-142. In some embodiments, a configuration manager application 320 uses one or more access list 322 to control access to particular LUNs, i.e., to check that the particular source computer 127-128 had authorization to access the particular LUN 141-142 on one particular target 140.

The storage network 149, in some embodiments, is implemented as a fibre-channel loop 148 as shown in FIG. 6. In other embodiments, storage network 149 is implemented as a fibre-channel fabric.

One can choose either of two types of storage mapping: target-and-LUN mapping 314 or target-only mapping 312. Target-and-LUN mapping 314 maps an iSCSI-target-and-LUN combination to a physical storage target-and-LUN combination. Target-only mapping maps an iSCSI target to a physical storage target and its LUNs.

With target-and-LUN mapping, an iSCSI target name and iSCSI LUN number are specified (e.g., by computer 128) and mapped to the physical storage address of one LUN; specified by either a Loop ID+LUN combination, or a WWPN+LUN combination, or a WWNN. If the LUN is available, it is made available as an iSCSI LUN and numbered with the iSCSI LUN number specified. For example, if an iSCSI target and iSCSI LUN specified as "Database, LUN 9" were mapped to the physical storage address "LoopID 070, LUN 12", then LUN 12 would be available as one iSCSI LUN. An iSCSI driver in computer 128 would see the iSCSI target named Database, with one iSCSI LUN identified as LUN 9. The iSCSI LUN would appear as one storage device to a computer (e.g., server) 127-128. (See Table 1-1.)

TABLE 1-1

| Target-and-LUN Mapping Example Apparent to Server 128 in Device File | iSCSI Target Name | iSCSI LUN Available | Physical Storage Address | Physical LUN Available |
|---|---|---|---|---|
| /dev/sdb2 Apparent as one locally attached storage device. (Linux device file used as an example.) | "Database" "Database" appears as one controller with one LUN available. | LUN 9 iSCSI LUN is numbered as specified and can be different than the physical LUN number. | LoopID 070 Specifies the storage address of a storage controller. | LUN 12 The LUN number is specified as the only LUN to be mapped. |

With target-only mapping, an iSCSI target name is specified and mapped to the physical storage address of a storage controller only; either a Loop ID or WWPN. Any LUNs that are available in the storage controller are made available as iSCSI LUNs and are numbered the same as the LUNs in the storage controller. For example, if an iSCSI target specified as "Webserver2000" were mapped to the physical storage address LoopID 050, and LUNs 1 through 3 were available in that controller, those LUNs would become available as three iSCSI LUNs within target "Webserver2000". An iSCSI driver would see the iSCSI target named Webserver2000 as a controller with three iSCSI LUNs identified as LUN 1, LUN 2, and LUN 3. Each iSCSI LUN would appear as a separate storage device to a server. (See Table 1-2.)

TABLE 1-2

| Target-only Mapping Example Apparent to Server in Device File | iSCSI Target Name | iSCSI LUNs Available | Physical Storage Address | Physical LUNs Available |
|---|---|---|---|---|
| /dev/sdb1 | Webserver2000 | LUN 1 | LoopID 050 | LUN 1 |
| /dev/sde1 | Webserver2000 | LUN 2 | LoopID 050 | LUN 2 |
| /dev/sdf1 | Webserver2000 | LUN 3 | LoopID 050 | LUN 3 |
| Apparent as three locally attached storage devices. (Linux device file used as an example.) | Webserver2000 appears as one controller with LUNs 1, 2, and 3 available. | iSCSI LUNs are numbered the same as physical LUNs. | Specifies the storage address of a storage controller. | iSCSI LUNs 1, 2, and 3 are available for mapping. |

Access for SCSI routing is controlled in the computers 127-128 and a storage router 110. In a server (e.g., computer 128), the IP address of each storage router 110 with which the server is to transport SCSI requests and responses is configured in its iSCSI driver. In a storage router 110, an access list 322 identifies which computers 127-128 can access storage devices 140 attached to it.

Once the access is configured in the computers 127-128 and a storage router 110, and once the storage mapping 318 is configured in the storage router 110, the storage router 110 routes SCSI requests and responses 101 between computers 127-128 and the mapped storage devices 140.

FIG. 4 further represents the concept of storage mapping and access control. In the FIG. 4, the storage router 110 provides three servers 127-128 (labeled Server A, Server B, and Server C) with IP access to disk drives that are configured across four disk controllers 340. The driver in each server 127-128 is configured to access the storage router IP address "10.1.2.3". An access list 322 in the storage router 110 specifies that servers A, B, and C are allowed to access the mapped storage devices. From the perspective of a server, each disk drive mapped to it appears as a locally attached disk drive. In this exemplary embodiment, Server A 127 has access to storage 341 that includes disk drives 1, 2, and 3 under disk controller 340 labeled Controller-1, and disk drives 1, 2, and 3 under disk controller 340 labeled Controller-2. In this exemplary embodiment, Server B has access to storage 342 that includes only disk drives 1 and 2 under disk controller 340 labeled Controller-3. In this exemplary embodiment, Server C 128 has access to storage 343 that includes disk drive 3 under disk controller 340 labeled Controller-3, and disk drives 1, 2, and 3 under disk controller 340 labeled Controller-4. In some embodiments, each disk drive corresponds to one LUN. In other embodiments, a LUN is a subset of one disk drive, and two or more LUNs are presented for one disk drive. In still other embodiments, a single LUN includes two or more drives, or portions of two or more drives. Thus, the controllers 340 can partition the disk drives into any desired configuration of sizes and number of LUNs as seen by storage router 110, and storage router 110 maps between the desired iSCSI LUNs used by the computers 127-128.

Table 1-3 shows the correlation between one exemplary access list, the storage router 110 IP address, and the storage device mapping. Note that the purpose of FIG. 4 and Table 1-3 is only to illustrate the concept of storage mapping and access control. The IP addresses will vary according to each implementation site. Similarly, the type of storage addressing (for example, WWNN, WWPN and LUN, or Loop ID and LUN) will vary according to the types of storage and the types of storage addressing preferred at each site. In addition, the figure and the table do not include an additional storage router 110 that could be added and configured for high availability.

TABLE 1-3

| Storage Mapping and Access Control Concept Servers Allowed Access via storage router 110's Access List | Storage Devices Apparent to Server as Locally Attached Devices | Via storage router 110 IP Address | Mapped To Controller | Drive |
|---|---|---|---|---|
| Server A | Drive D | 10.1.2.3 | 1 | 1 |
|  | Drive E | 10.1.2.3 | 1 | 2 |
|  | Drive F | 10.1.2.3 | 1 | 3 |
|  | Drive G | 10.1.2.3 | 2 | 1 |
|  | Drive H | 10.1.2.3 | 2 | 2 |
|  | Drive I | 10.1.2.3 | 2 | 3 |
| Server B | Drive D | 10.1.2.3 | 3 | 1 |
|  | Drive B | 10.1.2.3 | 3 | 2 |
| Server C | Drive D | 10.1.2.3 | 4 | 1 |
|  | Drive E | 10.1.2.3 | 4 | 2 |
|  | Drive F | 10.1.2.3 | 4 | 3 |
|  | Drive G | 10.1.2.3 | 3 | 3 |

SCSI Routing Configuration Basics

When configuring the storage router 110 for SCSI routing, one will specify the following parameters:

Access list, which specifies the IP addresses of servers allowed to access a common set of storage resources via the storage router. You can create any number of access lists.

Name of SCSI routing services, which specifies the name of the instance of the SCSI routing services in the storage router. This becomes a binding point for the association of other configuration parameters such as the network IP address, targets, and access lists. You can define up to four SCSI routing service instances per stand-alone storage router 110, or per storage router cluster.

Network IP address, which specifies the storage router IP address that servers will address for access to storage.

Name of storage devices, which specifies the iSCSI target names and LUNs and the physical storage addresses (controllers and LUNs) mapped to the iSCSI targets and LUNs.

Storage (Device) interface, which specifies the storage router 110 interface to be used to interface with storage devices.

Server interface, which specifies the storage router 110 interface to be used to interface with servers.

Storage Router Cluster 300 Overview

Referring again to FIG. 6, one can configure a plurality of storage routers 100 in a cluster 300 to allow the storage routers 110 to back each other up in case of failure. A storage router cluster 300 includes, in some embodiments, two configured storage routers connected as follows:

Both connected to the same servers,

Both connected to the same storage systems, and

Both connected to each other through their management and high availability interfaces. In other embodiments, more than two storage routers 110 are used.

In a cluster, storage routers continually exchange HA information to propagate configuration data to each other and to detect failures in the cluster. The storage routers exchange HA information through two separate networks:

one connected to the management interface of each storage router and one connected to the high availability interface of each storage router. To make sure that HA information is exchanged reliably between storage routers, the storage routers balance the transmission of HA information between the management and the high availability interfaces.

A cluster supports up to four active SCSI routing service instances. At any given time, a SCSI routing service instance can run on only one storage router in a cluster. The SCSI routing service instance continues running on the storage router where it was started until it is explicitly stopped or failed over to another storage router in the cluster, or automatically fails over to another storage router because an interface is unavailable or another software or hardware problem occurs.

Each storage router in a cluster can run up to four SCSI routing service instances. For example, if one storage router is already running two SCSI routing service instances, it is eligible to run up to two additional SCSI routing service instances.

Cluster Configuration Basics

When configuring a storage router 110 for participation in a cluster, one will specify the following information:

HA IP address—Specifies the network IP address associated with the high availability (HA) interface 149.

Cluster name—Name of the cluster 300 to which the storage router belongs.

Merge or delete—Choose to merge configured SCSI routing service instances with others already defined in the cluster, or delete any configured instances before joining the cluster.

Note: Once a cluster configuration includes four SCSI routing service instances, no additional instances can be defined on the individual storage routers that belong to the cluster. A cluster supports a maximum of four SCSI routing service instances.

Interface Naming

Configuring the software for the storage router 110 requires that you understand hardware interface naming. This section describes the interface naming system used with the storage router 110 hardware.

Each storage router 110 interface is assigned a three-character name consisting of two lower-case letters followed by a number. The letters designate the interface type; the number designates the chassis slot occupied by the interface (i.e., two alpha characters and one numeric).

Table 1-4 shows valid interface type designators for storage router 110. For example, a Fibre Channel interface in chassis slot 1 would have the name fc1.

TABLE 1-4

Interface Type Designators

| Interface Type | Description |
|---|---|
| fc | Fibre Channel |
| ge | Gigabit Ethernet |

Figure 7:
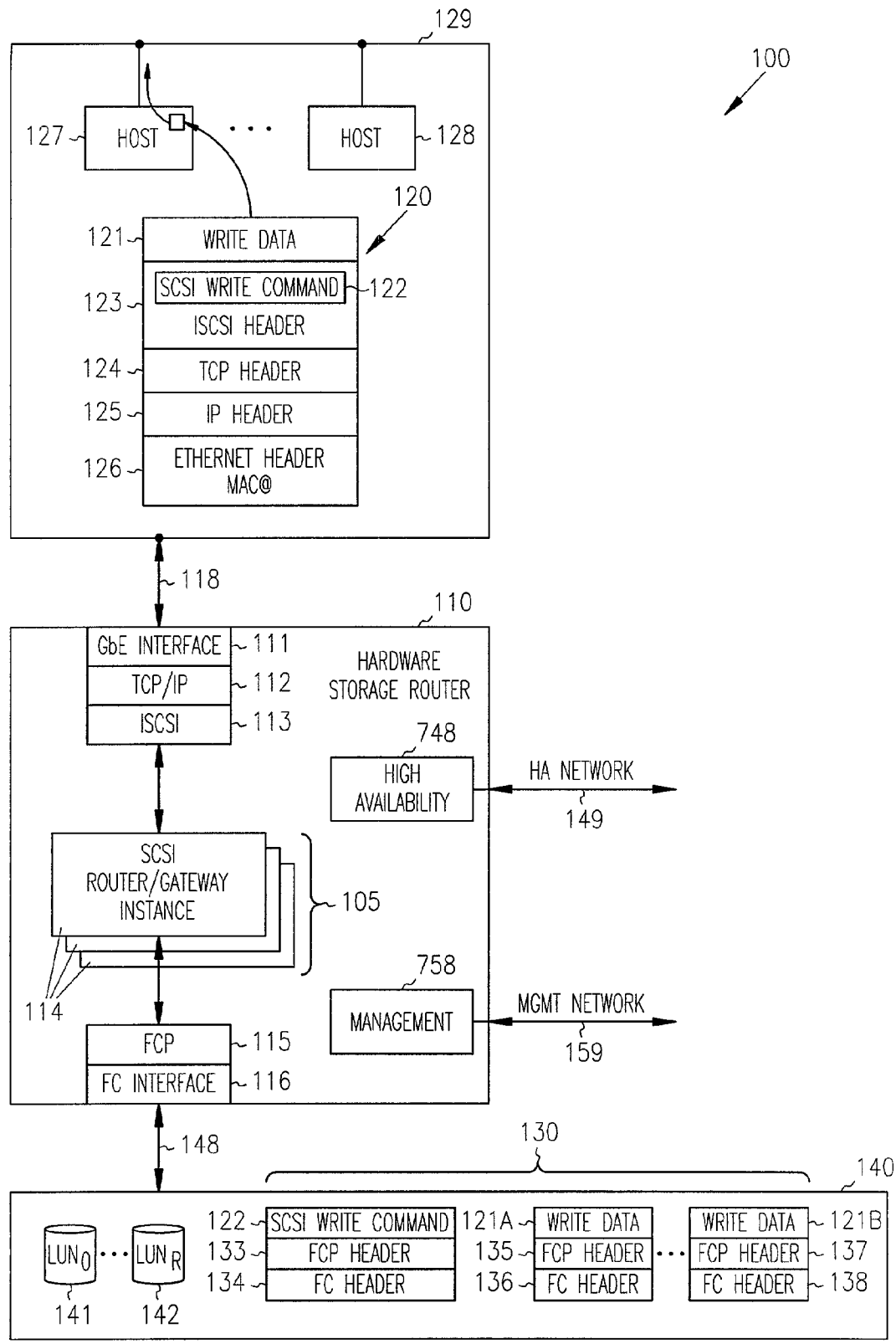
FIG. 7 shows the headers added to the iSCSI and to the fibre-channel commands and data.

FIG. 7 shows the headers added to the iSCSI and to the fibre-channel commands and data. On the host end (computers 127-128) the "write" command 122 and the associated data 121 to be written are embedded into one or more packets 120, by adding an iSCSI header 123, a TCP header 124, an IP header 125, and an ethernet header 126, having the MAC address of the GbE interface 111 of the destination. These packets are passed on network 129, and input through connection 118. GbE interface 111 processes the packets and removes header 126. TCP/IP interface 112 processes the packets and removes headers 125 and 124. iSCSI interface 113 processes the packets and removes header 123 and directs one of the sessions 114 (as specified in the iSCSI header) to perform its mapping to a physical storage address used by storage device 140, and the session 114 processes the mapped packets 130, for example, mapped to a fibre channel data structure 130, having a FCP header added by FCP interface 115 and an FC header added by FC interface 116. In some embodiments, this separates the write command 122 and one or more data portions 121A-121B having separate FCP headers 133, 135, and 137 respectively, and FC headers 134, 136, and 138 respectively.

Figure 8:
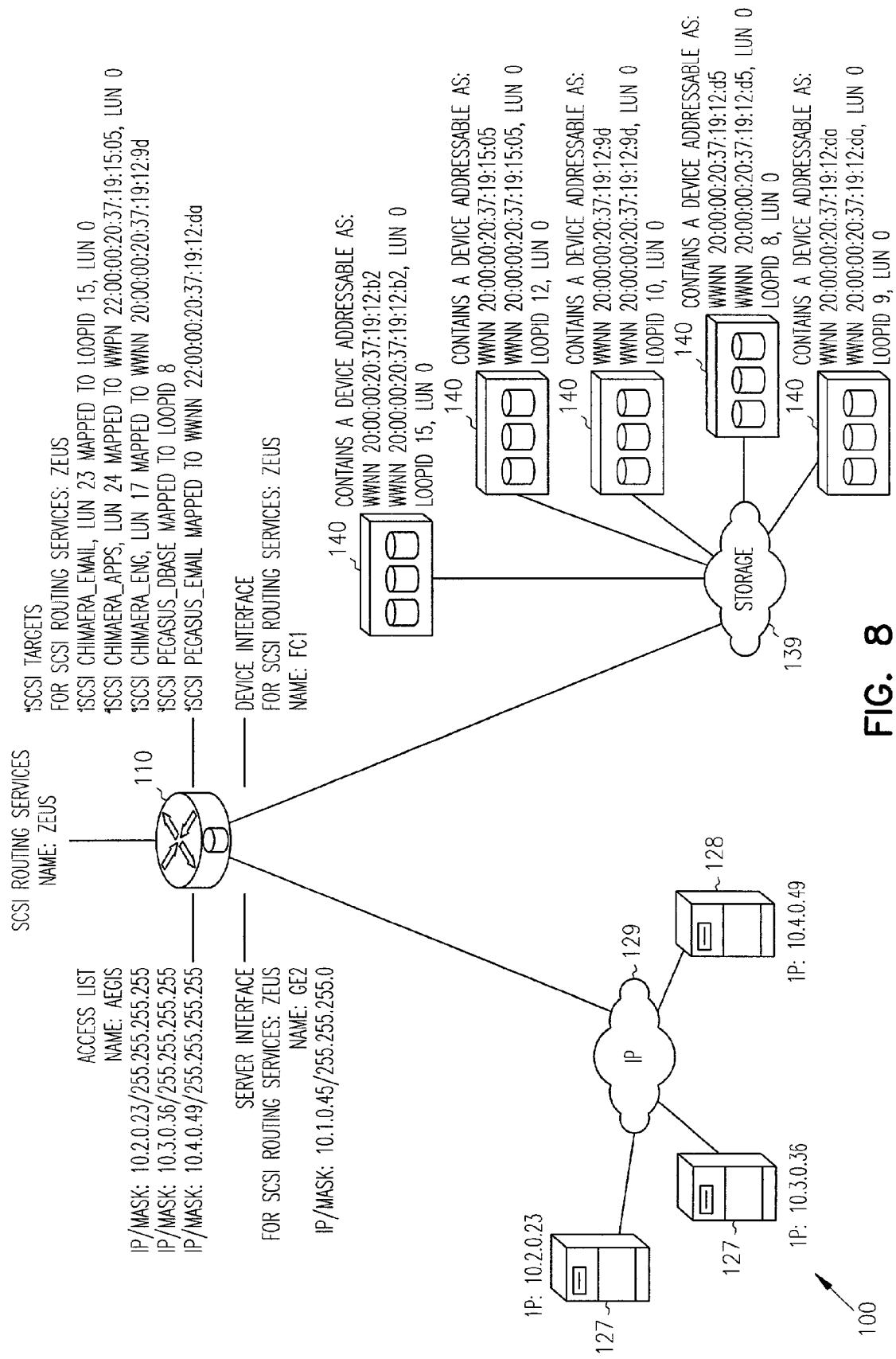
FIG. 8 is a block diagram of a SAN 100 showing naming and mapping.

FIG. 8 is a block diagram of a SAN 100 showing an example of iSCSI routing according to the present invention is illustrated in FIG. 8. In the example given in FIG. 8, an access list 322 consists of a list of the IP addresses of servers 127 that will have permission to access storage devices 140 via iSCSI target names. In one embodiment, Table 4 is used to create access list 322.

TABLE 4

| | Command | Description |
|---|---|---|
| Step 1 | enable | Enter Administrator mode. |
| Step 2 | create accesslist aegis | Create an access list; for example, create an access list named aegis. |
| Step 3 | add accesslist aegis 10.2.0.23/32, 10.3.0.36/32, 10.4.0.49/32 | Add IP addresses to the access list. For example, add the following IP addresses to the access list named aegis: 10.2.0.23, 10.3.0.36, and 10.4.0.49. Set the network mask for each IP address to 255.255.255.255 to limit the access to each IP address. |

Creating SCSI routing services consists of creating and naming a base set of SCSI routing services. Table 5 illustrates one method of creating SCSI routing services.

TABLE 5

| | Command | Description |
|---|---|---|
| Step 1 | enable | Enter Administrator mode. |
| Step 2 | create scsirouter Zeus | Create a SCSI routing service instance named zeus. |

In one embodiment, it is possible to define up to four instances on a single storage router 110 or across a cluster of routers 110.

Configuring a server interface consists of identifying which SCSI routing service instances to add to the server interface, identifying the server interface name, and assigning an IP address to the server interface. Table 6 illustrates one method of configuring a server interface for an instance of SCSI routing services.

TABLE 6

| | Command | Description |
|---|---|---|
| Step 1 | enable | Enter Administrator mode. |
| Step 2 | add scsirouter zeus serverif ge2 10.1.0.45/24 | Add server interface to SCSI routing services name zeus. Specify an IP address that servers will use to access the SCSI routing services, zeus. In addition, set the IP netmask to 255.255.255.0. |

Configuring a device interface consists of specifying which SCSI routing service instances to add to the device interface and the device interface name and topology. Table 7 illustrates one method of configuring a device interface for an instance of SCSI routing services.

TABLE 6

| | Command | Description |
|---|---|---|
| Step 1 | enable | Enter Administrator mode. |
| Step 2 | add scsirouter zeus deviceif fc1 | Add device interface to SCSI routing services named zeus. This will be the interface in the storage router that the SCSI routing services will use to access physical storage devices. |
| Step 3 | set interface fc1 topology loop or set interface fc1 topology ptp | Set the device interface topology. The device interface is configured to attempt link activation in a point-to-point topology, by default. If point-to-point is not successful, a loop topology is assumed.<br>1. If the storage devices are all connected to a hub with the intention of running in an arbitrated loop, change the device interface topology to loop, as shown in the first example.<br>2. If the storage devices are all connected in a point-to-point topology, change the device interface topology to ptp, as shown in the second example. |
| Step 4 | save all | Save your configuration before rebooting the storage router. |
| Step 5 | reboot | Reboot the storage router. A reboot is necessary to make the new interface topology selection effective. |

Once the device interface is added, the SCSI routing service instance becomes active.

Configuring iSCSI targets 140 consists of specifying the SCSI routing services to which the iSCSI target is to be added, specifying an iSCSI target, and mapping the iSCSI target to a physical storage device 140. When adding an iSCSI target, you can specify the physical storage device 140 either by physical storage address or by an index number assigned to the device. Some representative addressing modes are shown for each device 140 in FIG. 8.

High Availability Applications

One can configure a plurality of storage routers 100 in a cluster 300 to allow the storage routers 110 to back each other up in case of failure. A storage router cluster 300 includes, in some embodiments, two configured storage routers 110 connected as follows:

Both connected to the same servers 127, 128,

Both connected to the same storage systems 140, and

Both connected to each other through their management and high availability interfaces. In other embodiments, more than two storage routers 110 are used.

Figure 11:
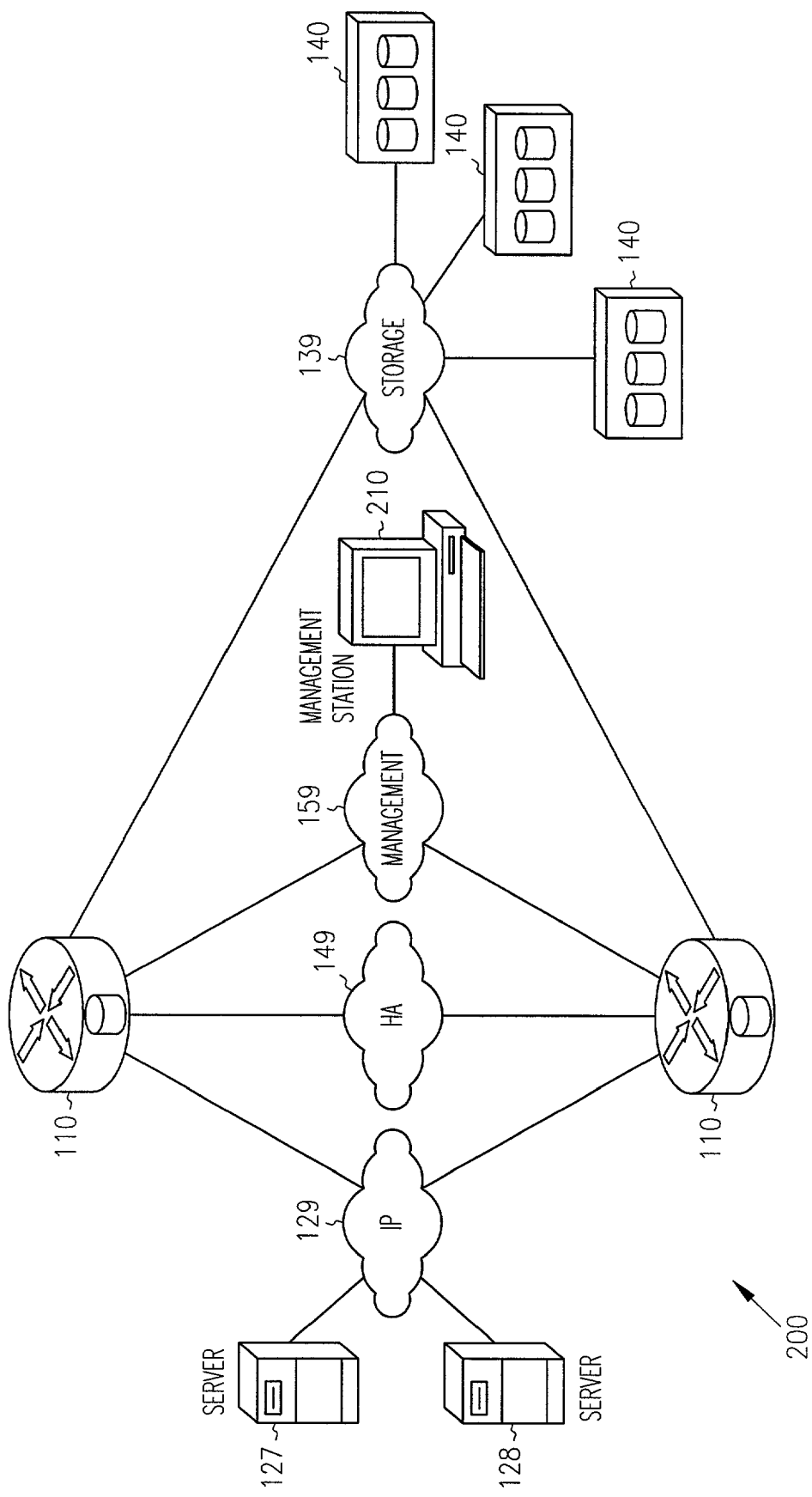
FIG. 11 shows a block diagram of a sample storage-router network 200.

In one embodiment, storage routers 110 within a cluster 300 continually exchange HA information to propagate configuration data to each other and to detect failures in the cluster. In one such embodiment (such as is shown in FIG. 11), storage routers 110 exchange HA information through two separate networks: one connected to the management interface 158 of each storage router 110 and the other connected to the high availability interface 148 of each storage router 110. To make sure that HA information is exchanged reliably between storage routers 110, in one embodiment, storage routers 110 balance the transmission of HA information between the management and the high availability interfaces. In one such embodiment, configuration information is exchanged in the manner described in "METHOD AND APPARATUS FOR EXCHANGING CONFIGURATION INFORMATION BETWEEN NODES OPERATING IN A MASTER-SLAVE CONFIGURATION," patent application Ser. No. 10/128,657, filed herewith.

In one embodiment, each cluster 300 supports up to four active SCSI routing service instances. At any given time, a SCSI routing service instance can run on only one storage router in a cluster. The SCSI routing service instance continues running on the storage router where it was started until it is explicitly stopped or failed over to another storage router in the cluster, or automatically fails over to another storage router because an interface is unavailable or another software or hardware problem occurs.

Each storage router in a cluster can run up to four SCSI routing service instances. For example, if one storage router is already running two SCSI routing service instances, it is eligible to run up to two additional SCSI routing service instances.

Cluster Configuration Basics

When configuring the storage router 110 for participation in a cluster, one will specify the following information:

HA IP address—Specifies the network IP address associated with storage router 110 high availability (HA) interface 149.

Cluster name—Name of the cluster 300 to which the storage router belongs.

Merge or delete—Choose to merge configured SCSI routing service instances with others already defined in the cluster, or delete any configured instances before joining the cluster.

In one embodiment, once a cluster configuration includes four SCSI routing service instances, no additional instances can be defined on the individual storage routers 110 that belong to the cluster. In that embodiment, a cluster supports a maximum of four SCSI routing service instances.

Applications

Various applications of computer system 100 will be discussed next. A Storage Service Provider is able to immediately deploy new storage services at lower costs using system 100. Moving storage over the IP infrastructure also allows the SSP (storage service provider) to offer customers secure (encrypted) access to storage at price points not possible with today's storage products.

As noted above, customers outsource their storage to a SSP provider who will manage their storage needs for a pre-determined fee. A typical application would use a distributed Fibre-Channel (FC) network to connect an IP network to FC devices located at either a local or a remote site. In this example, the SSP provides the entire storage infrastructure on the customers premises. While Fibre Channel has numerous advantages, it lacks network management tools and is significantly higher priced than comparable Ethernet products. Most importantly, due to lack of network security, the SSP must create a separate Storage Area Networks (SAN) for each customer at the SSP to separate data from multiple customers.

In contrast, system 100 can use one SAN for multiple customers due to the security features (e.g., LUN mapping and masking) available in system 100. In addition, the use of IP products throughout system 100 lowers the total cost of implementation and adds advantages such as greater ability to scale, improved management tools and increased security.

In another application, the Application/Internet Service Provider (ASP/ISP) is able to centralize Web server storage using system 100. Centralization using system 100 dramatically lowers the cost of storage for Web servers and provides a means of backing up real-time data over IP.

Finally, enterprise customers gain significant cost savings in deploying storage over IP by leveraging their installed IP infrastructure. As storage becomes universally accessible using IP, local applications also will be able to be shared globally, greatly simplifying the task of managing storage. Mirroring and off-site backup of data over the IP infrastructure is expected to be an important application.

Figure 9:
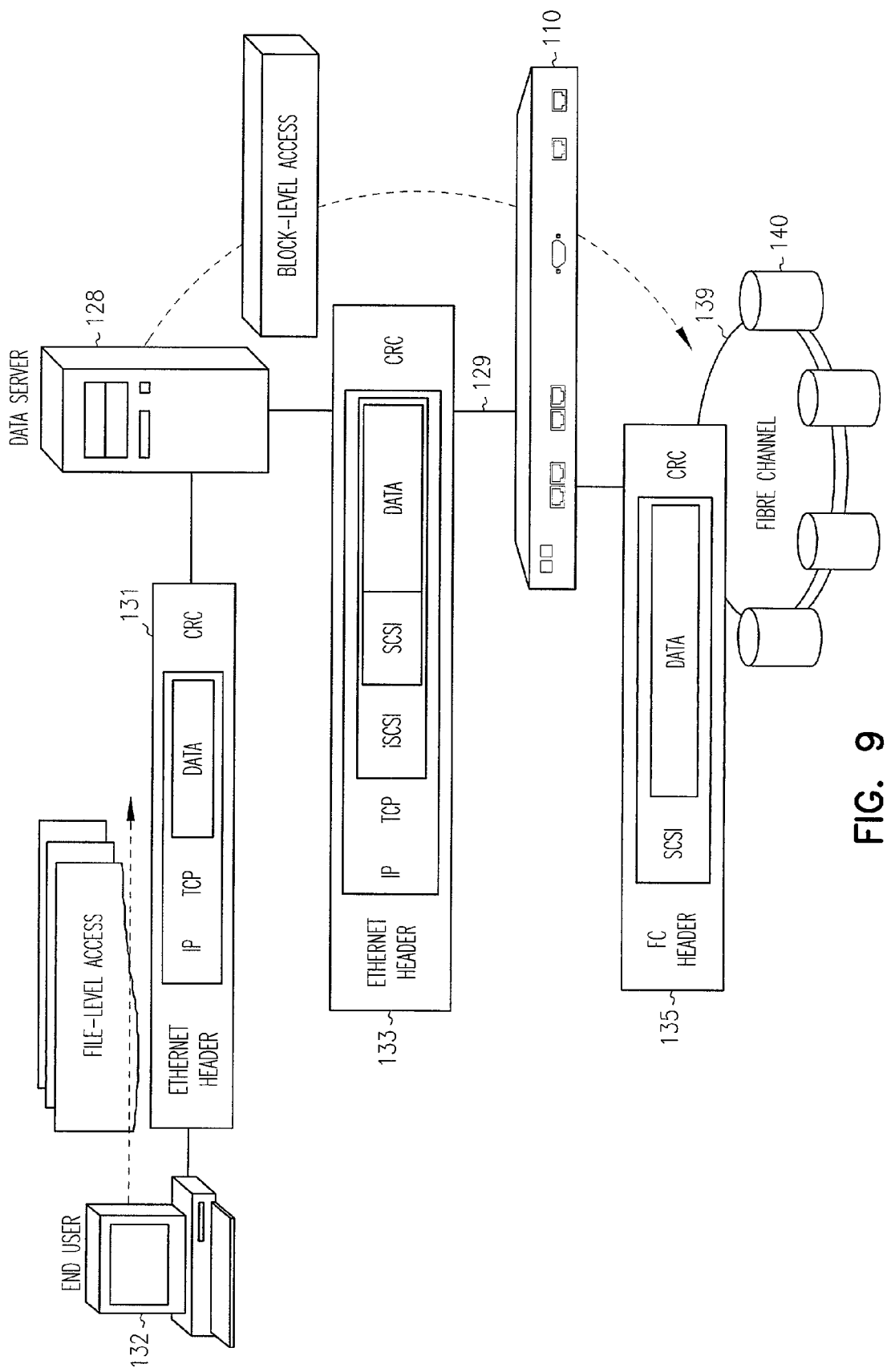
FIG. 9 is a block diagram of a SAN 100 showing SCSI encapsulation.

FIG. 9 is a block diagram of a SAN 100 showing SCSI encapsulation. In one embodiment, a driver in each server 127, 128 is used to encapsulate SCSI commands into one or more IP packets. Such an embodiment is shown in FIG. 9. In the embodiment shown in FIG. 9, the driver implements the iSCSI specification. The iSCSI protocol is a transport protocol for SCSI that operates on top of TCP. It is described in "draft-ietf-ips-iSCSI-12.txt" on the Internet Engineering Task Force web site, http://www.ietf.com.

The iSCSI protocol aims to be fully compliant with the requirements laid out in the SCSI Architecture Model-2 (SAM2) document, published by the SCSI committee. The iSCSI protocol is a mapping of the SCSI remote procedure invocation model (see the SAM document) over the TCP protocol. SCSI commands are carried by iSCSI requests and SCSI responses and status are carried by iSCSI responses. iSCSI also uses the request response mechanism for iSCSI protocol mechanisms.

Returning to FIG. 9, an end user initiates a request for data from computer 132. Computer 132 sends the request via one or more IP packets 131 to server 128. Server 128 creates one or more SCSI block requests based on the file request received from computer 132, encapsulates the SCSI block requests within IP packets 133 and sends the encapsulated packets 133 across IP network 129 to storage router 110. Storage router 110 extracts the SCSI block requests and sends the requests across storage network 139 to storage device 140. In the embodiment shown, storage network 139 is a Fibre-Channel (FC) network and the SCSI block requests are sent across storage network 139 as Fibre-Channel packets 135.

Figure 10:
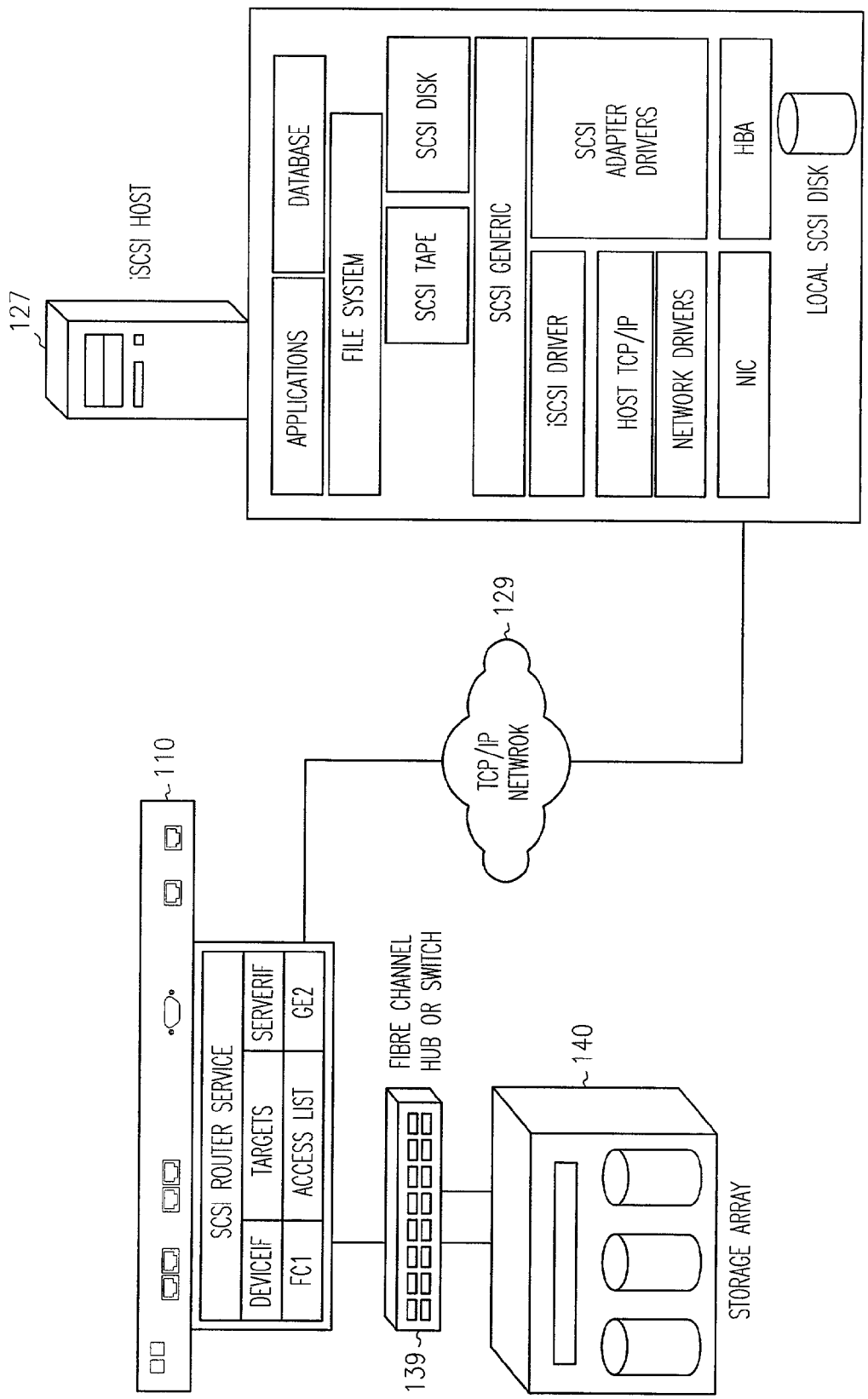
FIG. 10 is a block diagram of a SAN 100 showing naming and mapping.

FIG. 10 is a block diagram of a SAN 100 showing naming and mapping. In some embodiments, each server 127,128 that requires IP access to storage 140 via the storage router 110 must have an iSCSI driver, such as the Cisco Storage Networking iSCSI driver, installed. One such embodiment is shown in FIG. 10, where an iSCSI driver 181 is inserted between the SCSI generic application 183 and the transport layer 185. Using the iSCSI protocol, iSCSI driver 181 allows a server 128 to generate SCSI requests and responses and transport them over an IP network 129. From the perspective of a server's operating system, the iSCSI driver appears to be a SCSI or Fibre Channel driver for a peripheral channel in the server 128.

As noted above, one disadvantage of systems for accessing storage area networks (SANs) over IP networks is the lack of security. In contrast, security in system 100 takes advantage of the many mechanisms available for security services in IP networks. With existing SAN security, SSPs often have to allocate separate storage resources to each customer. In addition, the SSP has to worry about the segregation and privacy of the customer's data as it crosses the SSP's shared fiber optic infrastructure. Concepts like virtual private networks, encryption, authentication, and access control do not exist in SANs. All of these concepts, however, are present in IP networks. By encapsulating SCSI over IP, the years of development of security in IP networks becomes instantly available to storage networks and to the storage service providers, allowing them to ensure access control to storage and the privacy of data on their shared infrastructure.

FIG. 11 shows a block diagram of a sample storage-router network 200. Servers 127-128 with iSCSI drivers access the storage routers 110 through an IP network 129 connected to the Gigabit Ethernet interface 104 of each storage router 110. The storage routers 110 access storage devices 140 through a storage network 138 connected to the Fibre Channel interface 106 of each storage router 110. A management station 210 manages the storage routers 110 through an IP network 159 connected to the management interface 158 and/or 168 of each storage router. For high-availability operation, the storage routers 110 communicate with each other over two networks: the HA network 149 connected to the HA interface 148 of each storage router 110, and the management network 159 connected to the management interface 158 and/or 168 of each storage router 110.

Figure 12:
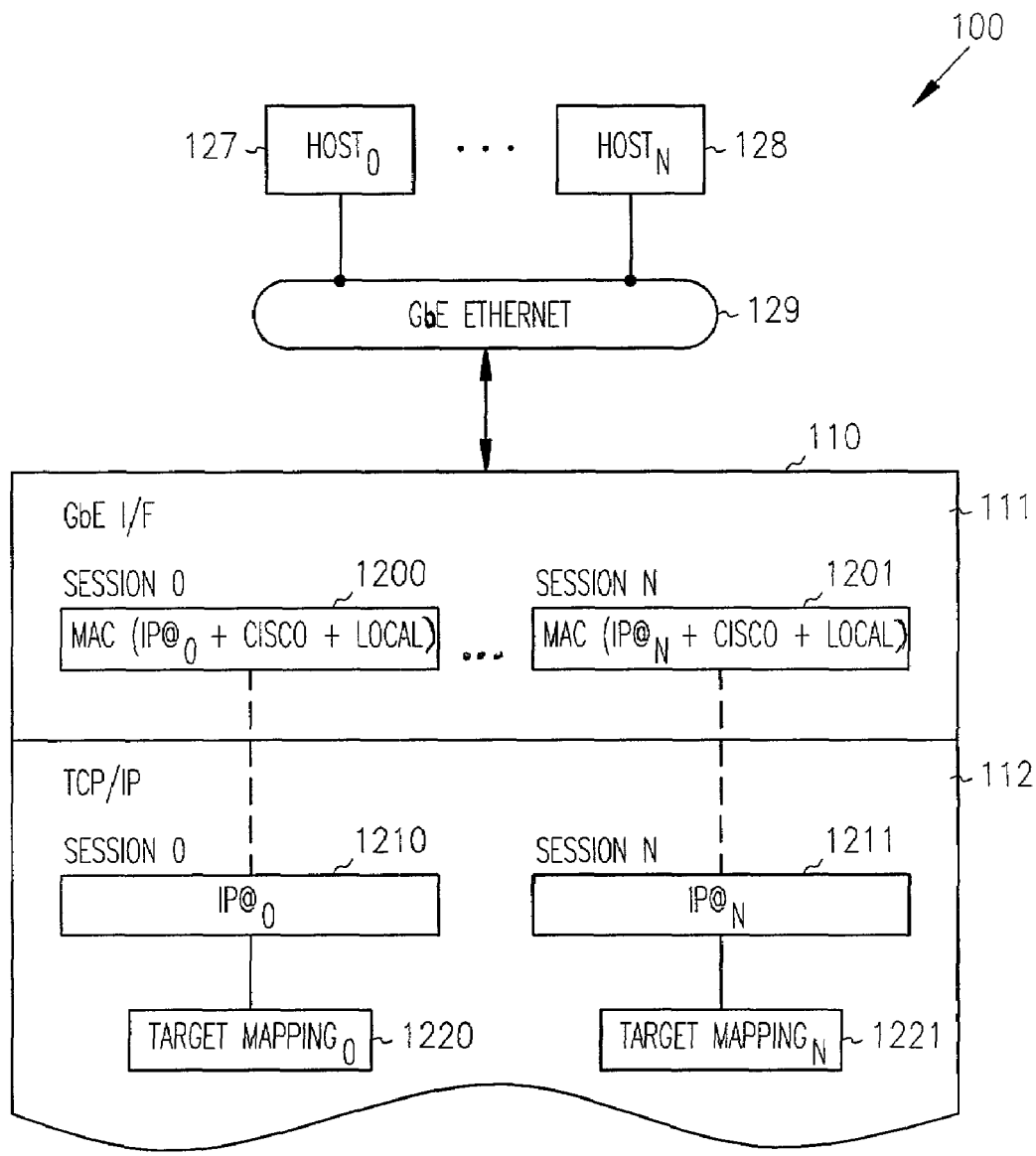
FIG. 12 is a block diagram of a SAN 100 showing MACs having IP information.

FIG. 12 is a block diagram of a storage are network 100 showing MACs having IP information. In some embodiments, such a scheme is used to provide unique MAC addresses for each TCP/IP session, wherein all of those MAC addresses are recognized and processed by GbE interface 110. In some embodiments, session 0 1210 would have an IP address that was unique in this system 100 (called IP@(0)), and IP@(0) would also be embedded in the MAC address 1200 used for session 0. Similarly, session N 1211 would have an IP address that was unique in this system 100 (called IP@(N)), and IP@(N) would also be embedded in the MAC address 1201 used for session N. In some embodiments, the MAC addresses would also include bits such as bits identifying CISCO (for example) and bits used by the local GbE network. Each IP address is associated with a different session 1210 to 1211, and each includes its own target mapping 1220 to 1221 respectively (each of which could be target-only type mapping, or target-LUN type mapping). In some embodiments, different mapping types are used for different sessions (not all mappings need be the same). In other embodiments, the same mapping type is used for all sessions 1210-1211.

Figure 13:
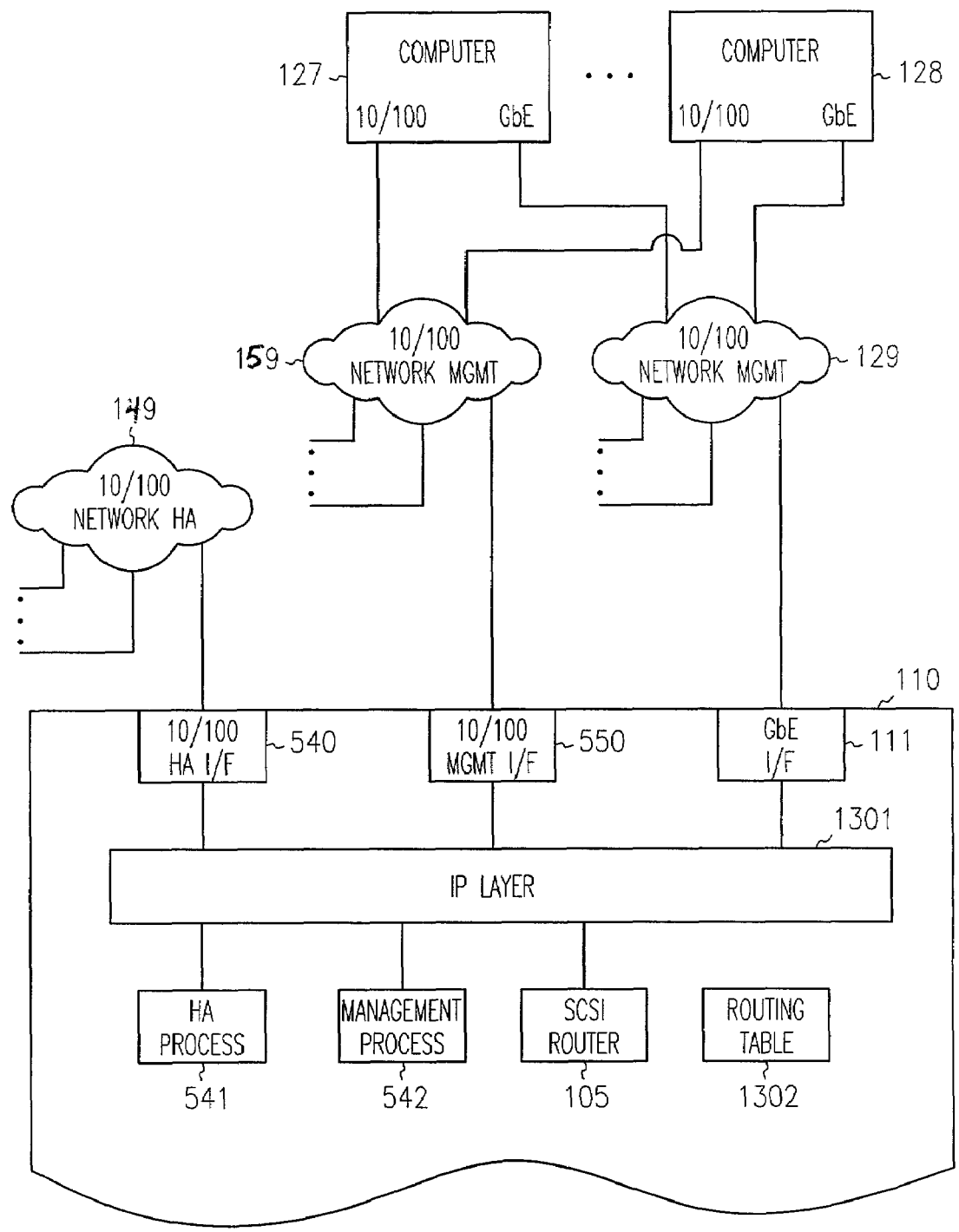
FIG. 13 is a block diagram of a SAN 100 showing an IP layer 1301.

FIG. 13 is a block diagram of a SAN 100 showing high-availability and management options and a common IP layer 1301. The plurality of computers 127-128 are all connected through GbE network 129 to storage router 110. In some embodiments, one or more of computers 127-128 are also connected to a 10/100 ethernet network used for the management interface 550. HA interface 540 is connected to HA 10/100 ethernet network 149. In some embodiments, high-availability process 541, management process 542 and SCSI router 105 all use a common IP layer 1301. Since there are more than one path from the SCSI router 105 to a host computer 127, it is desirable to "bind" or permanently associate the path through the much-faster GbE network 129 for storage commands, while binding management sessions to the slower management network 159. Thus, in some embodiments, IP routing table 1302 is set up to force all storage operations to use the GbE network 129 and to force all management operations to use HA 10/100 ethernet network 149. This provides better performance than the case where a route through the HA 10/100 ethernet network 149 could be used for some of the storage operations.

Figure 14:
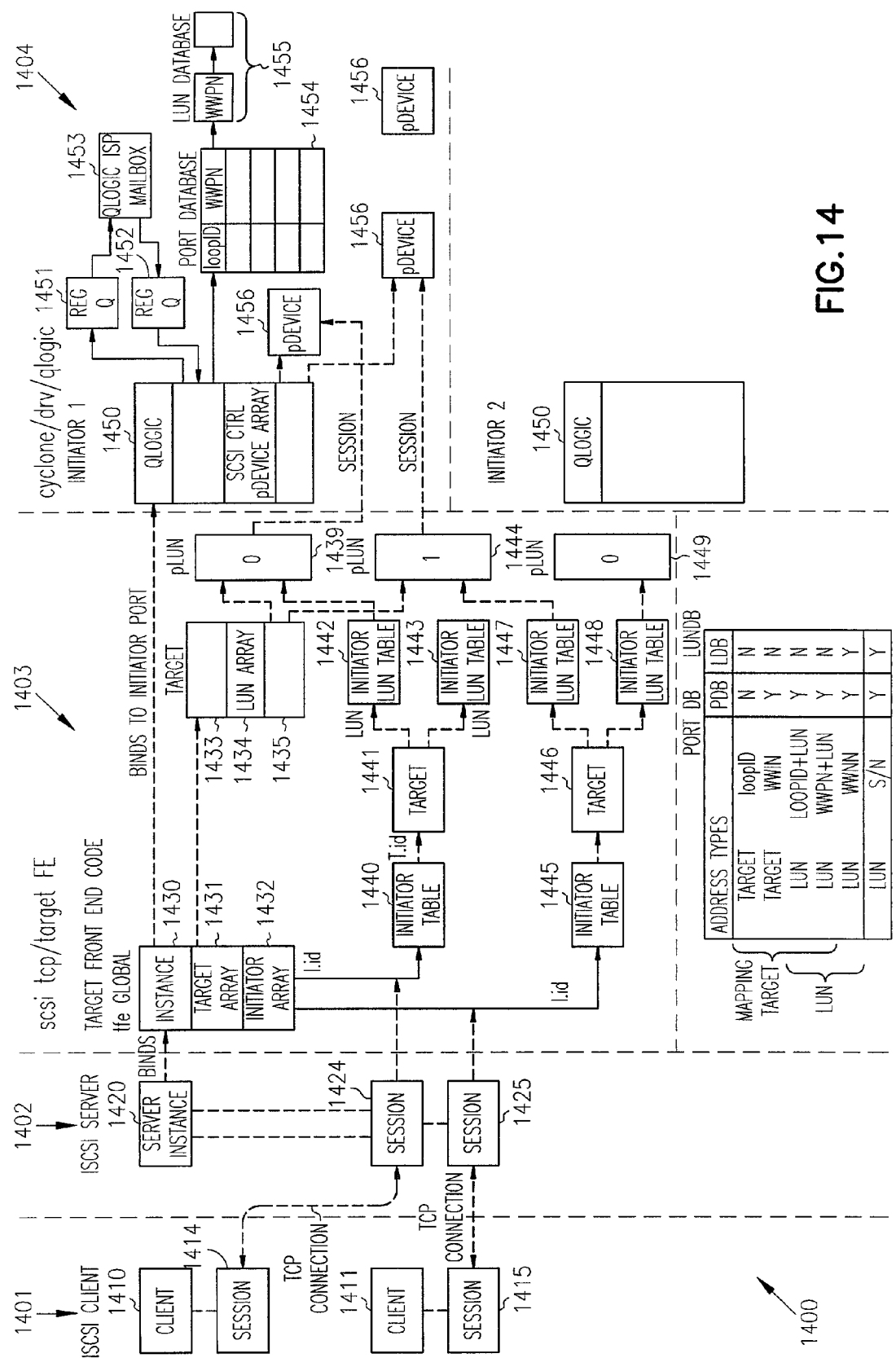
FIG. 14 is a block diagram of a virtual SCSI router 1400.

FIG. 14 is a block diagram of a virtual SCSI router 1400, used in some embodiments of the invention. Virtual SCSI router 1400 includes an iSCSI client 1401, an iSCSI server 1402, a SCSI TCP/target front end 1403, and a driver to the fibre-channel initiator 1404. iSCSI client 1401 includes a plurality of clients 1410-1411, each having a respective session 1414-1415. iSCSI server 1402 includes a server instance 1420 having a plurality of sessions 1424-1425, wherein each session 1424-1425 has a TCP connection to a respective session 1414-1415 of the iSCSI clients 1401. Server instance 1420 binds to a target front end (TFE) global instance 1430, which includes a target array 1431 and an initiator array 1432. TFE global instance 1430 binds to the Qlogic structure 1450. Initiator array 1432 includes pointer initiatorIDs to initiator tables 1440 and 1445 which in turn have pointer targetIDs to respective targets 1441 and 1446, each of which has LUN pointers to initiator LUN tables 1442, 1443, 1447, and 1448, which provide pointers to physical LUNs (pLUN 0 1439, pLUN 1 1444, and pLUN 0 1449). The Qlogic structure 1404 includes request queue 1451, response queue 1452, and mailbox 1453. It also has port database 1454 and LUN database 1455, as well as SCSI controller physical device (pDevice) array having pointers to pDevices 1456. In some embodiments, each initiator (towards the physical SCSI device targets) has its own Qlogic data structure 1450.

Thus, this virtual SCSI system can map iSCSI targets and/or LUNs on the left to physical targets and/or LUNs on the right as if a SCSI bus were transporting SCSI commands and data. Mappings (five types) include target to loopID (which does not use the port database or the LUN database), target to WWPN (which uses only the port DB), target/LUN to loopID-and-LUN (which does not use the port database or the LUN database), target/LUN to WWPN-and-LUN (which uses the port database only)

target/LUN to WWNN (which uses both the port database and the LUN database).

CONCLUSION

The present invention provides a storage router apparatus 110 that includes an internet protocol (IP) port 104 for coupling to a network 129 supporting IP packets, the network 129 having a plurality of information-handling systems 127-128, a fibre channel port 106 for coupling to a fibre channel network 139 to a plurality of storage devices 140, and a SCSI router 1400 having an iSCSI application that extracts SCSI command and data information from packets received through the IP port, wherein the SCSI router passes the extracted SCSI command and data information to the fiber channel port using a virtual SCSI bus including a virtual initiator supported by initiator table 1440 and a virtual target supported by target data structure 1441 in the storage router apparatus.

Some embodiments further include a first session to a first one of the plurality of information-handling systems, wherein the first session supports a first target-only mapping, wherein a source-specified target value received from the first information-handling system is replaced by a mapped target value that is then passed by the SCSI router toward a first storage device.

Some embodiments further include a second session to a second one of the plurality of information-handling systems, wherein the second session supports a second target-only mapping, wherein a source-specified target value received from the second information-handling system is replaced by a mapped target value that is then passed by the SCSI router toward the first storage device.

Some such embodiments further include a second session to a second one of the plurality of information-handling systems, wherein the second session supports a third target-only mapping, wherein a source-specified target value received from the second information-handling system is replaced by a mapped target value that is then passed by the SCSI router toward a second storage device.

Some such embodiments further include a second session to a second one of the plurality of information-handling systems, wherein the second session supports a first target-and-LUN mapping, wherein source-specified target and LUN information received from the second information-handling system is replaced by a mapped target-and-LUN value that is then passed by the SCSI router toward a second storage device. In some embodiments, the mapped target-and-LUN value includes a loop-ID-and-LUN combination. In other embodiments, the mapped target-and-LUN value includes a WWPN and LUN combination. In yet other embodiments, the mapped target-and-LUN value includes a WWNN.

Some other embodiments further include a first session to a first one of the plurality of information-handling systems, wherein the first session supports a first target-and-LUN mapping for the first session, wherein a source-specified target value received from the first information-handling system is replaced by a mapped target-and-LUN value that is then passed by the SCSI router toward a first storage device.

Some embodiments further include a second session to a second one of the plurality of information-handling systems, wherein the second session supports a second target-and-LUN mapping for the second session, wherein a source-specified target value received from the second information-handling system is replaced by a mapped target-and-LUN value that is then passed by the SCSI router toward the first storage device.

Some embodiments further include a second session to a second one of the plurality of information-handling systems, wherein the second session supports a second target-and-LUN mapping for the second session, wherein a source-specified target value received from the second information-handling system is replaced by a mapped target-and-LUN value that is then passed by the SCSI router toward a second storage device.

In some embodiments, the iSCSI application creates one or more sessions to each one of the plurality of information-handling systems and supports a first target-only mapping for a first one of the sessions, and a second target-only mapping for a second one of the sessions.

In some such embodiments, the iSCSI application supports a first target-and-LUN mapping for a third one of the sessions, and a second target-and-LUN mapping for a fourth one of the sessions.

Another aspect of the present invention provides a method that includes creating a first session to a first information-handling system on a network supporting IP packets, the network having a plurality of information-handling systems, receiving IP packets through an internet protocol (IP) port coupled to the network, extracting a SCSI command and data from one or more of the received packets, and using a virtual SCSI router including a virtual initiator and a virtual target to route the extracted SCSI command and data to a physical device.

Some embodiments of the method further include initiating a first session to a first one of the plurality of information-handling systems, and, for the first session, performing a first target-only mapping for the first session, wherein a source-specified target value received from the first information-handling system is replaced by a mapped target value that is then passed by the SCSI router toward the mapped target and its LUNs in a first storage device.

Some embodiments of the method further include initiating a second session to a second one of the plurality of information-handling systems, and for the second session, performing a second target-only mapping for the second session, wherein a source-specified target value received from the second information-handling system is replaced by a mapped target value that is then passed by the SCSI router toward the first storage device.

Some embodiments of the method further include initiating a second session to a second one of the plurality of information-handling systems, and for the second session, performing a third target-only mapping for the second session, wherein a source-specified target value received from the second information-handling system is replaced by a mapped target value that is then passed by the SCSI router toward a second storage device.

Some embodiments of the method further include initiating a second session to a second one of the plurality of information-handling systems, and for the second session, performing a first target-and-LUN mapping for the first session, wherein a source-specified target value received from the second information-handling system is replaced by a mapped target-and-LUN value that is then passed by the SCSI router toward a second storage device.

Some embodiments of the method further include initiating a first session to a first one of the plurality of information-handling systems, and for the first session, performing a first target-and-LUN mapping for the first session, wherein a source-specified target value received from the first information-handling system is replaced by a mapped target-and-LUN value that is then passed by the SCSI router toward a first storage device.

Some embodiments of the method further include initiating a second session to a second one of the plurality of information-handling systems, and for the second session, performing a second target-and-LUN mapping for the second session, wherein a source-specified target value received from the second information-handling system is replaced by a mapped target-and-LUN value that is then passed by the SCSI router toward the first storage device.

Some embodiments of the method further include initiating a second session to a second one of the plurality of information-handling systems, wherein the second session supports a second target-and-LUN mapping for the second session, wherein a source-specified target value received from the second information-handling system is replaced by a mapped target-and-LUN value that is then passed by the SCSI router toward a second storage device.

Some embodiments of the method further include creating one or more sessions to each one of the plurality of information-handling systems, and performing a first target-only mapping for a first one of the sessions, and a second target-only mapping for a second one of the sessions.

Some embodiments of the method further include performing a first target-and-LUN mapping for a third one of the sessions, and a second target-and-LUN mapping for a fourth one of the sessions.

Some embodiments of the method further include creating one or more sessions to each one of the plurality of information-handling systems, and performing a first target-and-LUN mapping for a first one of the sessions, and a second target-and-LUN mapping for a second one of the sessions.

Another aspect of the present invention provides a storage router apparatus that includes an internet protocol (IP) port for coupling to a network supporting IP packets, the network having a plurality of information-handling systems, a storage port for coupling to a storage network connected to a plurality of storage devices, and virtual initiator and target means for mapping and routing SCSI command and data information from packets received through the IP port into SCSI command and data information sent out the storage port.

The present invention also provides combinations of any two or more of the above features.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A storage router apparatus comprising:
an internet protocol (IP) port for coupling to a network supporting IP packets, the network having a plurality of information-handling systems;
a fibre channel port for coupling to a fibre channel network to a plurality of storage devices; and
one or more SCSI routers to define one or more sessions, each session including an identification of a set of one or more targets on the plurality of storage devices and having an iSCSI application that extracts SCSI command and data information from packets received through the IP port, wherein the one or more SCSI routers are configured to pass extracted SCSI command and data information to the fibre channel port using a virtual SCSI bus including a virtual initiator and a virtual target in the storage router apparatus.

2. The apparatus of claim 1, wherein the one or more sessions include a first session to a first one of the plurality of information-handling systems, wherein the first session supports a first target-only mapping, wherein a source-specified target value received from the first information-handling system is replaced by a mapped target value that is then passed by a SCSI router of the one or more SCIS routers toward a first storage device.

3. The apparatus of claim 2, wherein the one or more sessions include a second session to a second one of the plurality of information-handling systems, wherein the second session supports a second target-only mapping, wherein a source-specified target value received from the second information-handling system is replaced by a mapped target value that is then passed by a SCSI router of the one or more SCIS routers toward the first storage device.

4. The apparatus of claim 2, wherein the one or more sessions include a second session to a second one of the plurality of information-handling systems, wherein the second session supports a third target-only mapping, wherein a source-specified target value received from the second information-handling system is replaced by a mapped target value that is then passed by a SCSI router of the one or more SCIS routers toward a second storage device.

5. The apparatus of claim 2, wherein the one or more sessions include a second session to a second one of the plurality of information-handling systems, wherein the second session supports a first target-and-LUN mapping, wherein a source-specified target value received from the second information-handling system is replaced by a mapped target-and-LUN value that is then passed by a SCSI router of the one or more SCIS routers toward a second storage device.

6. The apparatus of claim 1, wherein the one or more sessions include a first session to a first one of the plurality of information-handling systems, wherein the first session supports a first target-and-LUN mapping for the first session, wherein a source-specified target value received from the first information-handling system is replaced by a mapped target-and-LUN value that is then passed by a SCSI router of the one or more SCIS routers toward a first storage device.

7. The apparatus of claim 6, wherein the one or more sessions include a second session to a second one of the plurality of information-handling systems, wherein the second session supports a second target-and-LUN mapping for the second session, wherein a source-specified target value received from the second information-handling system is replaced by a mapped target-and-LUN value that is then passed by a SCSI router of the one or more SCIS routers toward the first storage device.

8. The apparatus of claim 6, wherein the one or more sessions include a second session to a second one of the plurality of information-handling systems, wherein the second session supports a second target-and-LUN mapping for the second session, wherein a source-specified target value received from the second information-handling system is replaced by a mapped target-and-LUN value that is then passed by a SCSI router of the one or more SCIS routers toward a second storage device.

9. The apparatus of claim 1, wherein the one or more sessions include a first target-only mapping for a first one of the sessions, and a second target-only mapping for a second one of the sessions.

10. The apparatus of claim 9, wherein the one or more sessions include a first target-and-LUN mapping for a third one of the sessions, and a second target-and-LUN mapping for a fourth one of the sessions.

11. A storage-router method comprising:
creating a plurality of sessions, wherein each session includes an identification of a set of one or more targets for a plurality of storage devices on a fibre channel network;
initiating a first session of the plurality of sessions to a first information-handling system of a plurality of information handling systems on a network supporting IP packets, the network having a plurality of information-handling systems;
receiving IP packets through an internet protocol (IP) port coupled to the network;
extracting a SCSI command and data from one or more of the received packets; and
using a virtual SCSI router including a virtual SCSI bus providing a connection between a virtual initiator and a virtual target to route the extracted SCSI command and data to a target of the one or more targets on a physical device, wherein the target is represented by the virtual target.

12. The method of claim 11, further comprising:
for the first session, performing a first target-only mapping for the first session, wherein a source-specified target value received from the first information-handling system is replaced by a mapped target value that is then passed by the virtual SCSI router toward a first storage device.

13. The method of claim 12, further comprising:
initiating a second session to a second one of the plurality of information-handling systems; and
for the second session, performing a second target-only mapping for the second session, wherein a source-specified target value received from the second information-handling system is replaced by a mapped target value that is then passed by the virtual SCSI router toward the first storage device.

14. The method of claim 12, further comprising:
initiating a second session to a second one of the plurality of information-handling systems; and
for the second session, performing a third target-only mapping for the second session, wherein a source-specified target value received from the second information-handling system is replaced by a mapped target value that is then passed by the virtual SCSI router toward a second storage device.

15. The method of claim 12, further comprising:
initiating a second session to a second one of the plurality of information-handling systems; and
for the second session, performing a first target-and-LUN mapping for the first session, wherein a source-specified target value received from the second information-handling system is replaced by a mapped target-and-LUN value that is then passed by the virtual SCSI router toward a second storage device.

16. The method of claim 11, further comprising:
for the first session, performing a first target-and-LUN mapping for the first session, wherein a source-specified target value received from the first information-handling system is replaced by a mapped target-and-LUN value that is then passed by the virtual SCSI router toward a first storage device.

17. The method of claim 16, further comprising:
initiating a second session to a second one of the plurality of information-handling systems; and
for the second session, performing a second target-and-LUN mapping for the second session, wherein a source-specified target value received from the second information-handling system is replaced by a mapped target-and-LUN value that is then passed by the virtual SCSI router toward the first storage device.

18. The method of claim 16, further comprising:
initiating a second session to a second one of the plurality of information-handling systems, wherein the second session supports
a second target-and-LUN mapping for the second session, wherein a source-specified target value received from the second information-handling system is replaced by a mapped target-and-LUN value that is then passed by the virtual SCSI router toward a second storage device.

19. The method of claim 11, further comprising:
performing a first target-only mapping for a first one of the plurality of sessions, and a second target-only mapping for a second one of the plurality of sessions.

20. The method of claim 19, further comprising:
performing a first target-and-LUN mapping for a third one of the plurality of sessions, and a second target-and-LUN mapping for a fourth one of the plurality of sessions.

21. The method of claim 11, further comprising:
performing a first target-and-LUN mapping for a first one of the plurality of sessions, and a second target-and-LUN mapping for a second one of the plurality of sessions.

22. A storage router apparatus comprising:
  means for coupling an internet protocol (IP) port to a network supporting IP packets, the network having a plurality of information-handling systems;
  means for coupling a storage port to a storage network connected to a plurality of storage devices;
  means for creating one or more sessions, each session including an identification of a set of one or more targets on the plurality of storage devices; and
  means for providing a virtual initiator and target associated with a session of the one or more sessions and connected through a virtual SCSI bus for mapping and routing SCSI command and data information from packets received through the IP port into SCSI command and data information sent out the storage port.

23. The apparatus of claim 22, wherein the means for providing a virtual initiator and target further includes means for performing a first target-only mapping.

24. The apparatus of claim 23, wherein the means for providing a virtual initiator and target further includes means for performing a second target-only mapping.

25. The apparatus of claim 23, wherein the means for providing a virtual initiator and target further includes means for performing a first target-and-LUN mapping.

26. The apparatus of claim 22, wherein the means for providing a virtual initiator and target further includes means for performing a first target-and-LUN mapping.

27. The apparatus of claim 26, wherein the means for performing the first target-and-LUN mapping includes means for mapping to a loop-ID and LUN combination.

28. The apparatus of claim 26, wherein the means for performing the first target-and-LUN mapping includes means for mapping to a WWPN and LUN combination.

29. The apparatus of claim 26, wherein the means for performing the first target-and-LUN mapping includes means for mapping to a WWNN.

* * * * *